(12) United States Patent
Sugiura et al.

(10) Patent No.: US 12,216,274 B2
(45) Date of Patent: Feb. 4, 2025

(54) METHOD AND PROGRAM FOR PREDICTING BENDING IN OPTICAL PRODUCTS

(71) Applicant: TOKAI OPTICAL CO., LTD., Okazaki (JP)

(72) Inventors: Muneo Sugiura, Okazaki (JP); Koichi Tamura, Okazaki (JP); Takuro Yoshida, Okazaki (JP)

(73) Assignee: Tokai Optical Co., Ltd., Okazaki (JP)

( * ) Notice: Subject to any disclaimer, the term of this patent is extended or adjusted under 35 U.S.C. 154(b) by 845 days.

(21) Appl. No.: 17/305,611

(22) Filed: Jul. 12, 2021

(65) Prior Publication Data
US 2021/0341733 A1 Nov. 4, 2021

Related U.S. Application Data

(63) Continuation of application No. PCT/JP2019/050662, filed on Dec. 24, 2019.

(30) Foreign Application Priority Data

Jan. 17, 2019 (JP) .................................. 2019-006368

(51) Int. Cl.
  *G02B 27/00* (2006.01)
  *G02B 1/10* (2015.01)
  (Continued)

(52) U.S. Cl.
  CPC .......... *G02B 27/0012* (2013.01); *G02B 1/10* (2013.01); *G06F 30/20* (2020.01); *G06F 2111/10* (2020.01)

(58) Field of Classification Search
  CPC .. G02B 27/0012; G06F 30/20; G06F 2111/10
  (Continued)

(56) References Cited

U.S. PATENT DOCUMENTS 10,545,731 B1 * 1/2020 Ciolfi ...................... G06F 30/20
11,131,838 B2 * 9/2021 Ishihara ............... G02B 13/006
(Continued)

FOREIGN PATENT DOCUMENTS

WO WO-2020149118 A1 * 7/2020 ............... G02B 1/10

OTHER PUBLICATIONS

C.Q Guo, Predicting multilayer film's residual stress from its monolayers, Aug. 2016 (Year: 2016).*
(Continued)

*Primary Examiner* — Iftekhar A Khan
(74) *Attorney, Agent, or Firm* — BURR PATENT LAW, PLLC

(57) ABSTRACT

In the optical product bending prediction method according to the present invention, bending δ of a substrate having a film is predicted by a computer performing calculation (steps S11 to S13) of the following Expressions (A1), (B1), etc., in which a and $T_d$ are set as fitting parameters and have been optimized in each coating condition using a plurality of samples. Here, $\sigma_{int}$ is intrinsic stress, $E_f$ is a Young's modulus of a multilayer film, $v_f$ is a Poisson's ratio of the multilayer film, $\alpha_f$ is a linear coefficient expansion of the multilayer film, $\alpha_s$ is a linear coefficient expansion of the substrate, T is a room temperature, d is a film thickness, b is a substrate thickness, l is a radius of the substrate, $E_s$ is a Young's modulus of the substrate, and $v_s$ is a Poisson's ratio of the substrate.

[Mathematical 1]

$$\delta = \frac{3l^2}{b^2}\left(\frac{1-v_s}{E_s}\right)d\sigma \quad \text{(A1)}$$

(Continued)

-continued $$\sigma = a\sigma_{int} + (\alpha_s - \alpha_f)\left(\frac{E_f}{1-v_f}\right)(T - T_d) \quad (B1)$$

8 Claims, 19 Drawing Sheets

(51) Int. Cl.
  *G06F 30/20* (2020.01)
  *G06F 111/10* (2020.01)
(58) Field of Classification Search
  USPC .......................................................... 703/2
  See application file for complete search history.

(56) References Cited

U.S. PATENT DOCUMENTS

| | | | |
|---|---|---|---|
| 11,657,194 B2* | 5/2023 | Horesh | G06F 30/20 703/2 |
| 2007/0087529 A1 | 4/2007 | Chung et al. | |
| 2008/0157235 A1* | 7/2008 | Rogers | H01L 21/8258 257/415 |
| 2009/0061214 A1* | 3/2009 | Banno | G03F 7/70958 428/333 |
| 2009/0310220 A1* | 12/2009 | Suzuki | G02B 27/4272 359/558 |
| 2011/0295573 A1* | 12/2011 | Iwane | G06F 30/327 703/2 |
| 2016/0153811 A1* | 6/2016 | Tamura | G03F 9/7088 356/614 |
| 2020/0313121 A1* | 10/2020 | Kuo | H10K 59/12 |
| 2021/0088707 A1* | 3/2021 | Kawashima | G02B 27/0172 |
| 2021/0198426 A1* | 7/2021 | Yun | C08G 73/1042 |

OTHER PUBLICATIONS

Chuen-Lin Tien, Accurate prediction of multilayered residual, Nov. 2020 (Year: 2020).*
Huang-Wei Pan, Silicon nitride and silica quarter-wave stacks for low-thermal-noise mirror coatings, Aug. 2018 (Year: 2018).*
Çetinörgü, Eda, et al. "Mechanical and thermoelastic characteristics of optical thin films deposited by dual ion beam sputtering." Applied optics 48.23 (2009): 4536-4544. (Year: 2009).*
Stoney, Gerald G., "The Tension of Metallic Films Deposited by Electrolysis," *Proceedings of the Royal Society A*, May 6, 2009, vol. 8, Issue 53, pp. 172-175.
Abner Brenner, et al., "Calculation of Stress in Electrodeposits from the Curvature of a Plated Strip," *The Journal of Research of the National Bureau of Standards*, Feb. 1949, vol. 42, pp. 105-123.
Karen Hendrix, et al., "Optical Interference Coatings Design Contest 2013: Angle-Independent Color Mirror and Shortwave Infrared/Midwave Infrared Dichroic Beam Splitter," *Applied Optics*, Feb. 1, 2014, vol. 53, No. 4, pp. A360-A376.
Eda Centinörgü, et al., "Mechanical and Thermoelastic Characteristics of Optical Thin Films Deposited by Dual Ion Beam Sputtering," *Applied Optics*, Aug. 10, 2009, vol. 48, No. 23, pp. 4536-4544.
R. W. Hoffman, "The Mechanical Properties of Thin Condensed Films," *Physics of Thin Film*, Academic Press, New York, 1966, vol. 3, pp. 211-270.
"OIC 2013 Design Problems," *Optical Interference Coatings 2013*, Problem B.
International Search Report and Written Opinion (Application No. PCT/JP2019/050662) dated Mar. 31, 2020.

* cited by examiner

METHOD AND PROGRAM FOR PREDICTING BENDING IN OPTICAL PRODUCTS

This application is a Continuation of International Application No. PCT/JP2019/050662, filed on Dec. 24, 2019, which claims the benefit of Japanese Patent Application Number 2019-006368 filed on Jan. 17, 2019, the disclosures of which are incorporated by reference herein in their entireties.

BACKGROUND OF INVENTION

Technical Field

The present invention relates to a method and a program for predicting bending in an optical product having a single layer film or a multilayer film formed on a substrate.

Background Art

When a single layer film or a multilayer film such as a hard coating film or an antireflection film is formed on a substrate of an optical product such as a camera lens filter, the substrate (optical product) sometimes bends due to stress in the single layer film or the multilayer film.

Such bending can influence the performance of the optical product, and therefore it is desirable that there is no bending (bending=0).

Conventionally, designing of a single layer film or a multilayer film for an optical product without bending has been performed as follows. First, provisional designing is performed so as to satisfy the optical function, and a single layer film or a multilayer film corresponding to the provisional designing is experimentally formed on a substrate, thus forming a provisional optical product. Then, bending of the provisional optical product is measured and if there is bending (the absolute value of bending exceeds a predetermined value), another provisional designing is performed again with the above bending feedback. Subsequently, formation of a provisional optical product and actual measurement of bending thereof are repeated until bending does not occur any longer and thus the designing is determined.

Such a way of designing requires considerable labors and cost, and therefore calculation for bending in a single layer film or a multilayer film corresponding to designing has been attempted.

In Non-Patent Literatures "G. G. Stoney: Proc. R. Soc. London, Series A, 82, 172 (1909)", "R. W. Hoffman, 'The Mechanical Properties of Thin Condensed Films' in Physics of Thin Films (Academic, New York, 1966), Vol. 3, p. 211" and "A. Brenner and S. Senderoff: J. research NBS 42, 105 (1949)", it is disclosed that bending $\delta$ of an optical product is calculated from Stoney's expression (the following Expression (1)) regarding bending $\delta$ due to stress of a single layer film.

In Expression (1), d is a film thickness [m (meter)], $\sigma$ is film stress [Pa (pascal)], b is a thickness [m] of a disk-shaped substrate, l is a radius [m] of the substrate, $E_s$ is a Young's modulus [Pa] of the substrate, and $v_s$ is a Poisson's ratio [no unit] of the substrate.

[Mathematical 1]

$$\delta = \frac{3l^2}{b^2}\left(\frac{1-v_s}{E_s}\right)d\sigma \quad (1)$$

Regarding a multilayer film in which a high refractive index layer made of a high refractive index material and a low refractive index layer made of a low refractive index material are arranged alternately, as shown in Non-Patent Literature "Optical Interference Coatings 2013, Design Problem, Problem B", calculation for bending $\delta$ of a substrate having the multilayer film is attempted using the following Expressions (2) to (6) extended from the Stoney's expression.

Expression (2) is the same as Expression (1).

In Expressions (3) to (6), $d_H$ is a total film thickness [m] of the high refractive index layers, $d_L$ is a total film thickness [m] of the low refractive index layers, $\sigma_H$ is intrinsic stress [Pa] in the high refractive index layer, and $\sigma_L$ is intrinsic stress [Pa] in the low refractive index layer.

[Mathematical 2]

$$\delta = \frac{3l^2}{b^2}\left(\frac{1-v_s}{E_s}\right)d\sigma \quad (2)$$

$$d = d_H + d_L \quad (3)$$

$$\sigma = \tilde{d}_H \sigma_H + \tilde{d}_L \sigma_L \quad (4)$$

$$\tilde{d}_H = d_H/d \quad (5)$$

$$\tilde{d}_L = d_L/d \quad (6)$$

SUMMARY OF THE INVENTION

Problems to be Solved by the Invention

In the above calculation for bending $\delta$, stresses $\sigma$, $\sigma_H$, $\sigma_L$, etc. corresponding to the materials of the films (layers) are input parameters, and as the input parameters, predetermined values such as theoretical values are used. Therefore, error occurs between the calculated bending $\delta$ and bending that actually occurs after an optical product is manufactured. In particular, when there are many elements involved as in the case of the multilayer film, system error occurs in calculation for bending $\delta$, so that the calculated bending $\delta$ becomes more likely to differ from the actual bending. Thus, there is room for further improvement in accuracy of the above calculation for bending $\delta$.

Accordingly, a main object of the present invention is to provide optical product bending prediction method and program that enable accurate calculation for bending so that the number of process steps for manufacturing of a provisional optical product and feedback in provisional designing decreases or becomes zero, thus reducing labors and cost in manufacturing of an optical product.

Solution to the Problems

To achieve the above object, an invention according to a first aspect is an optical product bending prediction method of predicting bending $\delta$ of a substrate having a film by a computer performing calculation of later-described Expressions (7) to (15). In the Expressions, a is set as a first fitting parameter, $T_d$ is set as a second fitting parameter, and $\delta_s$ is set as a third fitting parameter, while the third fitting parameter $\delta_s$ and initial bending $\delta_0$ of the substrate are not taken into consideration in Expression (7). The parameters have been optimized in each coating condition using a plurality of samples. Here, $\sigma_{int}$ is intrinsic stress, $E_f$ is a Young's modulus of a multilayer film, $E_H$ is a Young's modulus of a high refractive index layer, $E_L$ is a Young's modulus of a low refractive index layer, $v_f$ is a Poisson's ratio of the multilayer film, $v_H$ is a Poisson's ratio of the high refractive index layer, $v_L$ is a Poisson's ratio of the low refractive index layer, $\alpha_f$ is a coefficient of linear expansion of the multilayer film, $\alpha_H$ is a coefficient of linear expansion of the high refractive index layer, $\alpha_L$ is a coefficient of linear expansion of the low refractive index layer, $\alpha_s$ is a coefficient of linear expansion of the substrate, T is a room temperature, d is a film thickness, b is a thickness of the substrate, l is a radius of the substrate, $E_s$ is a Young's modulus of the substrate, $v_s$ is a Poisson's ratio of the substrate, $d_H$ is a total film thickness of the high refractive index layer, $d_L$ is a total film thickness of the low refractive index layer, $\sigma_H$ is intrinsic stress of the high refractive index layer, and $\sigma_L$ is intrinsic stress of the low refractive index layer.

To achieve the above object, an invention according to a second aspect is an optical product bending prediction method of predicting bending $\delta$ of a substrate having a film by a computer performing calculation of later-described Expressions (9) to (17) excluding Expression (10), where the initial bending $\delta_0$ of the substrate is not taken into consideration in Expression (16). In the Expressions, $a_H$ is set as a first primary fitting parameter, $a_L$ is set as a first secondary fitting parameter, and $T_d$ is set as a second fitting parameter, and these parameters have been optimized in each coating condition using a plurality of samples. Here, $\sigma_{int}$ is intrinsic stress, $E_f$ is a Young's modulus of a multi-layer film, $E_H$ is a Young's modulus of a high refractive index layer, $E_L$ is a Young's modulus of a low refractive index layer, $v_f$ is a Poisson's ratio of the multilayer film, $v_H$ is a Poisson's ratio of the high refractive index layer, $v_L$ is a Poisson's ratio of the low refractive index layer, $\alpha_f$ is a coefficient of linear expansion of the multilayer film, $\alpha_H$ is a coefficient of linear expansion of the high refractive index layer, $\alpha_L$ is a coefficient of linear expansion of the low refractive index layer, $\alpha_s$ is a coefficient of linear expansion of the substrate, T is a room temperature, d is a film thickness, b is a thickness of the substrate, l is a radius of the substrate, $E_s$ is a Young's modulus of the substrate, $v_s$ is a Poisson's ratio of the substrate, $d_H$ is a total film thickness of the high refractive index layer, $d_L$ is a total film thickness of the low refractive index layer, $\sigma_H$ is intrinsic stress of the high refractive index layer, and $\sigma_L$ is intrinsic stress of the low refractive index layer.

In an invention according to a third aspect based on the above invention, the bending $\delta$ of the substrate having the film is predicted by the computer performing calculation of later-described Expressions (7) to (15) where the initial bending $\delta_0$ of the substrate is not taken into consideration in Expression (7). The Expressions have been optimized in each coating condition using a plurality of samples.

Similarly, the bending $\delta$ of the substrate having the film is predicted by the computer performing calculation of later-described Expressions (9) to (17) excluding Expression (10), where the third fitting parameter was introduced into Expression (16) and is taken into consideration but the initial bending $\delta_0$ of the substrate in Expression (16) is not taken into consideration. The expressions have been optimized in each coating condition using a plurality of samples.

In an invention according to a fourth aspect based on the above invention, the bending $\delta$ of the substrate having the film is predicted by the computer performing calculation of later-described Expressions (7) to (15) or Expressions (9) to (17) excluding Expression (10), where the third fitting parameter $\delta_s$ is not taken into consideration in Expressions (7). For the Expressions, optimization has been performed in each coating condition using a plurality of samples.

In an invention according to a fifth aspect based on the above invention, the bending $\delta$ of the substrate having the film is predicted by the computer performing calculation of later-described Expressions (7) to (15) or Expressions (9) to (17) excluding Expression (10), where the third fitting parameter was introduced into Expression (16) and is taken into consideration. For the Expressions, optimization has been performed in each coating condition using a plurality of samples.

To achieve the above object, an invention according to a sixth aspect is an optical product bending prediction program configured to form, through execution thereof by a computer, control means capable of referring to storage of later-described Expressions (7) to (15). In the Expressions, a is set as a first fitting parameter, $T_d$ is set as a second fitting parameter, and $\delta_s$ is set as a third fitting parameter, while the third fitting parameter $\delta_s$ and initial bending $\delta_0$ of the substrate are not taken into consideration in Expression (7). The parameters have been optimized in each coating condition using a plurality of samples. The control means is configured to predict bending $\delta$ of the substrate having a film through calculation of the Expressions (7) (where the third fitting parameter (s and the initial bending $\delta_0$ of the substrate are not taken into consideration) to (15). Here, $\sigma_{int}$ is intrinsic stress, $E_f$ is a Young's modulus of a multilayer film, $E_H$ is a Young's modulus of a high refractive index layer, $E_L$ is a Young's modulus of a low refractive index layer, $v_f$ is a Poisson's ratio of the multilayer film, $v_H$ is a Poisson's ratio of the high refractive index layer, $v_L$ is a Poisson's ratio of the low refractive index layer, $\alpha_f$ is a coefficient of linear expansion of the multilayer film, $\alpha_H$ is a coefficient of linear expansion of the high refractive index layer, $\alpha_L$ is a coefficient of linear expansion of the low refractive index layer, $\alpha_s$ is a coefficient of linear expansion of the substrate, T is a room temperature, d is a film thickness, b is a thickness of the substrate, l is a radius of the substrate, $E_s$ is a Young's modulus of the substrate, $v_s$ is a Poisson's ratio of the substrate, $d_H$ is a total film thickness of the high refractive index layer, $d_L$ is a total film thickness of the low refractive index layer, $\sigma_H$ is intrinsic stress of the high refractive index layer, and $\sigma_L$ is intrinsic stress of the low refractive index layer.

To achieve the above object, an invention according to a seventh aspect is an optical product bending prediction program configured to form, through execution thereof by a computer, control means capable of referring to storage of later-described Expressions (9) to (17) excluding Expression (10), where the initial bending $\delta_0$ of the substrate is not taken into consideration in Expression (16). In the Expressions, au is set as a first primary fitting parameter, $a_L$ is set as a first secondary fitting parameter, and $T_d$ is set as a second fitting parameter, and these parameters have been optimized in each coating condition using a plurality of samples. The control means is configured to predict bending $\delta$ of the substrate having a film through calculation of the Expressions (9) to (17) excluding Expression (10) (where the initial bending $\delta_0$ of the substrate is not taken into consideration in Expression (16)). Here, $\sigma_{int}$ is intrinsic stress, $E_f$ is a Young's modulus of a multilayer film, $E_H$ is a Young's modulus of a high refractive index layer, $E_L$ is a Young's modulus of a low refractive index layer, $v_f$ is a Poisson's ratio of the multilayer film, $v_H$ is a Poisson's ratio of the high refractive index layer, $v_L$ is a Poisson's ratio of the low refractive index layer, $\alpha_f$ is a coefficient of linear expansion of the multilayer film, $\alpha_H$ is a coefficient of linear expansion of the high refractive index layer, $\alpha_L$ is a coefficient of linear expansion of the low refractive index layer, $\alpha_s$ is a coefficient of linear expansion of the substrate, T is a room temperature, d is a film thickness, b is a thickness of the substrate, l is a radius of the substrate, $E_s$ is a Young's modulus of the substrate, $v_s$ is a Poisson's ratio of the substrate, $d_H$ is a total film thickness of the high refractive index layer, $d_L$ is a total film thickness of the low refractive index layer, $\sigma_H$ is intrinsic stress of the high refractive index layer, and $\sigma_L$ is intrinsic stress of the low refractive index layer.

An invention according to an eighth aspect based on the above invention forms, through execution thereof by the computer, the control means configured to predict the bending δ of the substrate having the film through calculation of later-described Expressions (7) to (15) where the initial bending $\delta_0$ of the substrate is not taken into consideration in Expression (7). The Expressions have been optimized in each coating condition using a plurality of samples.

Similarly, the control means is formed through execution thereof by the computer and is configured to predict the bending δ of the substrate having the film through calculation of later-described Expressions (9) to (17) excluding Expression (10). In the Expressions, the third fitting parameter was introduced into Expression (16) and taken into consideration, but the initial bending $\delta_0$ of the substrate in Expression (16) is not taken into consideration. The expressions have been optimized in each coating condition using a plurality of samples.

An invention according to a ninth aspect based on the above invention forms, through execution thereof by the computer, the control means configured to predict the bending δ of the substrate having the film through calculation of later-described Expressions (7) to (15) or Expressions (9) to (17) excluding Expression (10), where the third fitting parameter $\delta_s$ is not taken into consideration in Expressions (7). For the Expressions, optimization has been performed in each coating condition using a plurality of samples.

An invention according to a tenth aspect based on the above invention forms, through execution thereof by the computer, the control means configured to predict the bending δ of the substrate having the film through calculation of later-described Expressions (7) to (15) or Expressions (9) to (17) excluding Expression (10), where the third fitting parameter was introduced into Expression (16). For the Expressions, optimization has been performed in each coating condition using a plurality of samples.

Advantageous Effects of the Invention

A main effect of the present invention is to provide optical product bending prediction method and program that enable accurate calculation for bending so that the number of process steps for manufacturing of a provisional optical product and feedback in provisional designing decreases or becomes zero, thus reducing labors and cost in manufacturing of an optical product.

DESCRIPTION OF EMBODIMENTS

Hereinafter, examples of embodiments according to the present invention will be described with reference to the drawings as necessary. Embodiments of the present invention are not limited to these examples.

First Embodiment

Figure 1:
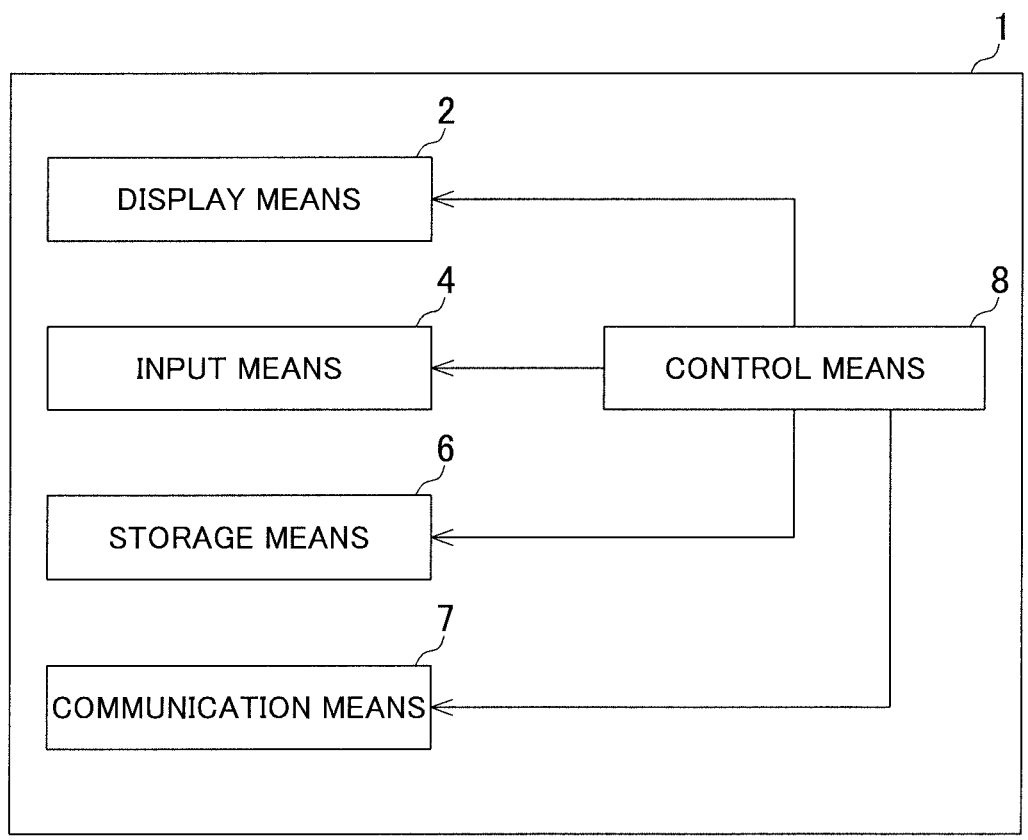
FIG. 1 is a block diagram of an optical product bending prediction device according to the first embodiment of the present invention.

An optical product bending prediction device (bending prediction device) 1 according to the first embodiment of the present invention includes a computer, and as shown in FIG. 1, includes display means 2, input means 4, storage means 6, communication means 7, and control means 8.

The optical product has a single layer film or a multilayer film formed on one or both surfaces of a substrate, and is, for example, a lens filter having a single layer film or an optical multilayer film (e.g., at least one of a hard coating film, an antireflection film, and a light reducing film), a light passage window cover having a single layer film or an optical multilayer film (e.g., an infrared communication portion cover or an infrared-type proximity sensor portion cover), or a mirror, a filter, or the like having an optical multilayer film.

The bending prediction device 1 is, for example, installed in an optical product company.

The display means 2 displays various kinds of information, and is, for example, a liquid crystal display or an organic electroluminescence display.

The input means 4 receives inputs of various kinds of information, and is, for example, at least one of a keyboard and a pointing device.

The display means 2 and the input means 4 may be integrated like a touch panel.

The storage means 6 stores various kinds of information, and is, for example, at least one of a hard disk, a memory, and a disk drive.

The communication means 7 communicates various kinds of information with an external device, and here, communicates with a device connected to a local area network (LAN).

The control means 8 controls these means, and is, for example, a central processing unit (CPU). The control means 8 sequentially reads a bending prediction program stored in the storage means 6 and performs processing for quantitative prediction for bending in accordance with the program.

Further, the storage means 6 stores the following Expressions (7) to (15) for quantitative prediction for bending of an optical product, as a part of the bending prediction program (in a state of being referable by the bending prediction program). That is, with the following Expressions (7) to (15), calculation for bending $\delta$ in the optical product having a multilayer film on one surface of the substrate is performed. It is noted that calculation for bending $\delta$ of a substrate having a single layer film may be performed with Expressions (7) to (15).

In Expressions (7) to (15), $\sigma_{int}$ is intrinsic stress [Pa], $E_f$ is a Young's modulus [Pa] of the multilayer film, $E_H$ is a Young's modulus [Pa] of a high refractive index layer, $E_L$ is a Young's modulus [Pa] of a low refractive index layer, $\alpha_f$ is a Poisson's ratio [no unit] of the multilayer film, $v_H$ is a Poisson's ratio [no unit] of the high refractive index layer, and $v_L$ is a Poisson's ratio [no unit] of the low refractive index layer. In addition, $\alpha_f$ is a coefficient of linear expansion [/K (per kelvin)] of the multilayer film, $\alpha_H$ is a coefficient of linear expansion [/K] of the high refractive index layer, $\alpha_L$ is a coefficient of linear expansion[/K] of the low refractive index layer, $\alpha_s$ is a coefficient of linear expansion [/K] of the substrate, T is a room temperature [K (kelvin)], and $\delta_0$ is bending (initial bending) [m] of the substrate on which the film has not been formed yet. Further, $d_H$ is a total film thickness [m] of the high refractive index layer, $d_L$ is a total film thickness [m] of the low refractive index layer, $\sigma_H$ is intrinsic stress [Pa] of the high refractive index layer, $\sigma_L$ is intrinsic stress [Pa] of the low refractive index layer, a is a first fitting parameter (film growth), $T_d$ is a second fitting parameter (temperature influence), and $\delta_s$ is a third fitting parameter (system error, etc.). A case where the sign of each value of stress and bending $\delta$ is positive corresponds to tensile stress (recessed on film formed surface side) and a case where the sign is negative corresponds to compressive stress (protruding on film formed surface side). It is noted that the unit [K] may be replaced with a unit [° C.], and the other units also may be changed to those equivalent thereto, as appropriate. Expressions (7) to (15) are based on the assumption that two materials of the high refractive index material and the low refractive index material are used, but may be extended to those for three materials.

Expression (7) is an expression obtained by newly introducing the third fitting parameter $\delta_s$ into Expression (1), and corresponds to Expression (A4).

Expression (8) is an expression newly introduced for extending Expression (1) for the purpose of improving accuracy (introducing a model expression matching the actuality) regarding, in particular, stress $\sigma$ in Expression (1). In Expression (8), the first fitting parameter a and the second fitting parameter $T_d$ are used. Expression (8) corresponds to Expression (B1).

Expression (9) is the same as Expression (3) and corresponds to Expression (C).

Expression (10) is an expression obtained by replacing stress 6 in Expression (4) with the intrinsic stress $\sigma_{int}$ in order to separately consider the influence of thermal stress in Expression (8), and corresponds to Expression (D).

Expressions (11) and (12) are the same as Expressions (5) and (6), and correspond to Expressions (E) and (F), respectively.

Expressions (13), (14), and (15) are newly introduced as expressions indicating parts (parameters for thermal stress) of Expression (8), and correspond to Expressions (G), (H), and (I), respectively.

[Mathematical 3]

$$\delta = \frac{3l^2}{b^2}\left(\frac{1-v_s}{E_s}\right)d\sigma + \delta_0 + \delta_s \quad (7)$$

$$\sigma = a\sigma_{int} + (\alpha_s - \alpha_f)\left(\frac{E_f}{1-v_f}\right)(T - T_d) \quad (8)$$

$$d = d_H + d_L \quad (9)$$

$$\sigma_{int} = \tilde{d}_H\sigma_H + \tilde{d}_L\sigma_L \quad (10)$$

$$\tilde{d}_H = d_H/d \quad (11)$$

$$\tilde{d}_L = d_L/d \quad (12)$$

$$E_f = \tilde{d}_H E_H + \tilde{d}_L E_L \quad (13)$$

$$v_f = \tilde{d}_H v_H + \tilde{d}_L v_L \quad (14)$$

$$\alpha_f = \tilde{d}_H \alpha_H + \tilde{d}_L \alpha_L \quad (15)$$

In the bending prediction device 1, the first, second, and third fitting parameters a, $T_d$, $\delta_s$ in Expressions (7) and (8) are optimized in advance on the basis of a plurality of actual measured values of bending, for each coating device (coating condition), and are stored in the storage means 6. In Expressions (7) to (15) for which the first to third fitting parameters have been optimized, various values relevant to the multilayer film in designing in a case of forming the film by the same coating device (same process) are substituted, whereby bending on the multilayer film in designing is quantitatively calculated.

Figure 2:
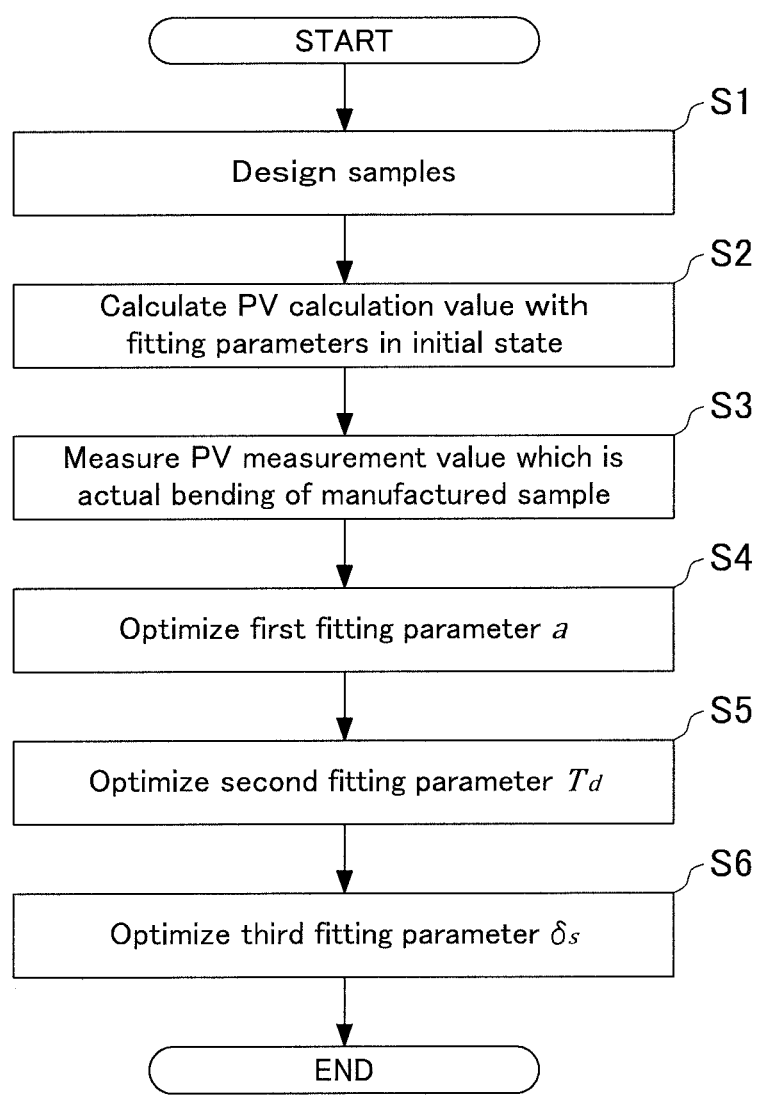
FIG. 2 is a flowchart showing an operation example for optimizing fitting parameters in the optical product bending prediction device when executing a bending prediction program according to the first embodiment of the present invention (an example of optimization of fitting parameters in an optical product bending prediction method).

FIG. 2 is a flowchart showing an operation example for optimizing the fitting parameters in the bending prediction device 1 when executing the bending prediction program (an example of optimization of the fitting parameters in the optical product bending prediction method).

Hereinafter, optimization of the first to third fitting parameters in a coating device D1 for forming a multilayer film by alternately depositing tantalum pentoxide $Ta_2O_5$ which is a high refractive index material and silicon dioxide $SiO_2$ which is a low refractive index material, will be described first. In the coating device D1, the vacuum degree of a chamber for deposition is set to about $5 \times 10^{-4}$ Pa, the substrate is not separately heated, and oxygen ($O_2$) gas is introduced at a constant flow rate into the chamber. Hereinafter, such a coating condition is referred to as coating condition I.

In optimization of the first to third fitting parameters, in advance, a plurality of samples are designed by setting the following values, i.e., the number of layers in the multilayer film (film alternately including the high refractive index layer made of $Ta_2O_5$ and the low refractive index layer made of $SiO_2$), a total physical film thickness (H film thickness) of the high refractive index layers, the total physical film thickness (L film thickness) of the low refractive index layers, the material of the substrate, the size of the substrate, and the like (step S1). Here, the substrate has a disk shape, and the size of the substrate is determined by diameter [mm (millimeter)] and a thickness [mm].

For each designed sample, the bending prediction device 1 (control means 8) provisionally calculates the bending δ (PV calculation value), using Expressions (7) to (15) with the first, second, and third fitting parameters set as a=1, $T_d$=T, and $δ_s$=0 (a state equal to Expressions (2) to (6) described in the background art except for $δ_0$, which is an initial state) (step S2). PV refers to Peak to Valley, and here, the bending δ is taken as a difference between the height of the uppermost end (the highest point on the substrate surface, which is Peak) and the height of the lowermost end (the lowest point on the substrate surface, which is Valley). Values other than the fitting parameters are input from the input means 4 on the basis of the design of each sample. Here, the intrinsic stress is set as $σ_H$=−270.5 [MPa (megapascal)] in the high refractive index layer and is set as $σ_L$=−588.0 [MPa] in the low refractive index layer. The bending prediction device 1 may be integrated with a film designing device, i.e., the bending prediction program and a film designing program may be installed in the same computer, and various values determined by the film designing program may be automatically passed to the bending prediction program. The bending δ may be taken as a Power value or the like, instead of PV. In the initial state, at least one of the fitting parameters may be different from the above value.

Then, each sample is actually manufactured on the basis of the design, and the bending δ (PV measurement value) of each manufactured sample is actually measured by a bending measurement device (step S3).

The following [Table 1] shows the samples (twenty examples Nos. 1 to 20) in the coating condition I. It is noted that, for both of the PV calculation value and the PV measurement value, λ=633 nm is used as a reference, but λ may be set to another value.

TABLE 1

| | Substrate | | | | Film (Unit of film thickness: μm) | | | | Measured |
|---|---|---|---|---|---|---|---|---|---|
| No. | Glass material | Flatness | Diameter (mm) | Thickness (mm) | Number of layers | Total film thickness | H film thickness | L film thickness | flatness PV |
| 1 | Synthetic quartz | λ/10 or less | 30 | 3 | 32 | 5.8 | 2.0 | 3.8 | −2.582λ |
| 2 | Synthetic quartz | λ/10 or less | 30 | 5 | 32 | 5.8 | 2.0 | 3.8 | −0.975λ |
| 3 | Synthetic quartz | λ/10 or less | 30 | 8 | 32 | 5.8 | 2.0 | 3.8 | −0.370λ |
| 4 | Synthetic quartz | λ/10 or less | 30 | 3 | 32 | 5.8 | 2.0 | 3.8 | −2.629λ |
| 5 | Synthetic quartz | λ/10 or less | 30 | 3 | 32 | 5.8 | 2.0 | 3.8 | −2.693λ |
| 6 | Synthetic quartz | λ/10 or less | 30 | 3 | 32 | 5.8 | 2.0 | 3.8 | −2.610λ |
| 7 | Synthetic quartz | λ/10 or less | 30 | 3 | 32 | 5.8 | 2.0 | 3.8 | −2.524λ |
| 8 | Synthetic quartz | λ/10 or less | 30 | 3 | 32 | 5.8 | 2.0 | 3.8 | −2.625λ |
| 9 | Synthetic quartz | λ/10 or less | 30 | 3 | 32 | 5.8 | 2.0 | 3.8 | −2.605λ |
| 10 | Synthetic quartz | λ/10 or less | 30 | 3 | 32 | 5.8 | 2.0 | 3.8 | −2.601λ |
| 11 | Synthetic quartz | λ/10 or less | 30 | 3 | 32 | 5.8 | 2.0 | 3.8 | −2.622λ |
| 12 | Synthetic quartz | λ/10 or less | 30 | 5 | 59 | 9.5 | 2.9 | 6.6 | −1.530λ |
| 13 | Synthetic quartz | λ/10 or less | 25.4 | 12 | 68 | 11.4 | 3.7 | 7.7 | −0.373λ |
| 14 | BK7 | λ/10 or less | 30 | 3 | 32 | 5.8 | 2.0 | 3.8 | −2.474λ |
| 15 | BK7 | λ/10 or less | 30 | 3 | 32 | 5.8 | 2.0 | 3.8 | −2.516λ |
| 16 | BK7 | λ/10 or less | 30 | 3 | 32 | 5.8 | 2.0 | 3.8 | −2.613λ |
| 17 | BK7 | λ/10 or less | 30 | 3 | 32 | 5.8 | 2.0 | 3.8 | −2.623λ |
| 18 | BK7 | λ/10 or less | 30 | 3 | 32 | 5.8 | 2.0 | 3.8 | −2.637λ |
| 19 | YAG | λ/10 or less | 30 | 6 | 63 | 10.3 | 3.3 | 7.0 | −0.355λ |
| 20 | CLEARCERAM | λ/10 or less | 25.4 | 12 | 68 | 11.4 | 3.7 | 7.7 | −0.249λ |

Then, the fitting parameters are determined so that the PV calculation value is fitted to the PV measurement value in each sample (steps S4 to S6). Here, the fitting parameters are determined in the order of the first fitting parameter a, the second fitting parameter $T_d$, then the third fitting parameter $δ_s$, as described below. The determination order of the fitting parameters may be changed, or at least two of the fitting parameters may be changed at the same time. In addition, the fitting parameters may be determined by another fitting method such as linear programming.

Figure 3:
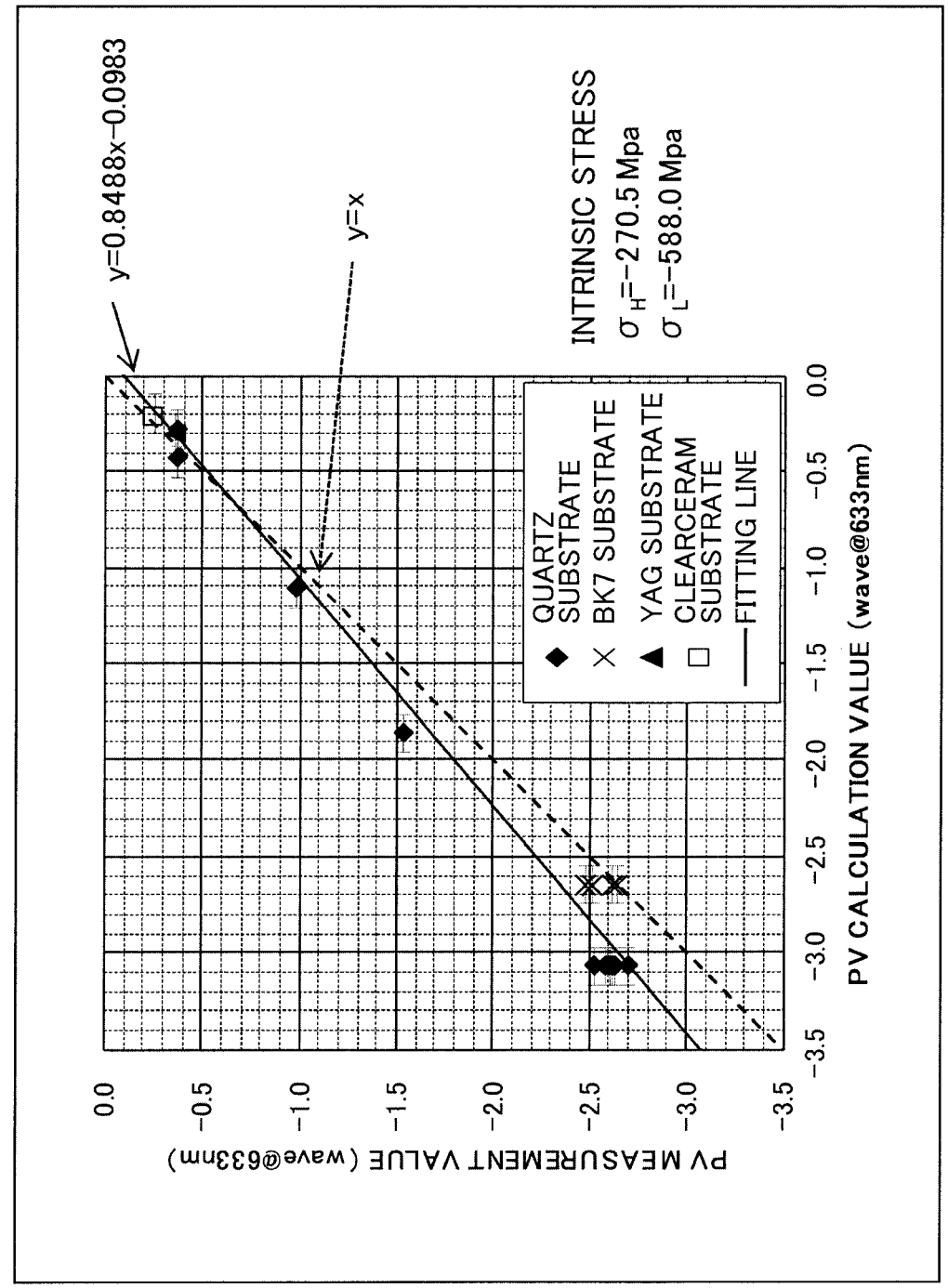
FIG. 3 is a graph with an initial bending calculation value set on the horizontal axis and a bending measurement value set on the vertical axis for samples formed in a coating condition I according to the first embodiment of the present invention.

That is, the PV calculation value of each sample that is a fitting target (initial state) has error relative to the PV measurement value. FIG. 3 is a graph with the PV calculation value set on the horizontal axis and the PV measurement value set on the vertical axis. A line represented by a dotted line in the graph is a line on which the PV calculation value and the PV measurement value are equal to each other (coincidence line). The fitting parameters are determined so that the PV calculation value is calculated to be as close to the coincidence line as possible. As a result, the PV calculation value matching the coating condition I is accurately calculated by Expressions (7) to (15) after the determination of the fitting parameters, without provisional manufacturing of the optical product.

A line (initial reference line) determined by a least squares method on the basis of the initial PV calculation values of the samples in [Table 1] is represented by y=0.8488x−0.0983, where x is the PV calculation value and y is the PV measurement value. This line is away from y=x (coincidence line).

Accordingly, first, the control means 8 optimizes the first fitting parameter a (step S4).

The first fitting parameter a is for multiplying the intrinsic stress (stress in single layer film) by a constant, and can correspond to the degree of film growth during coating.

Figure 4:
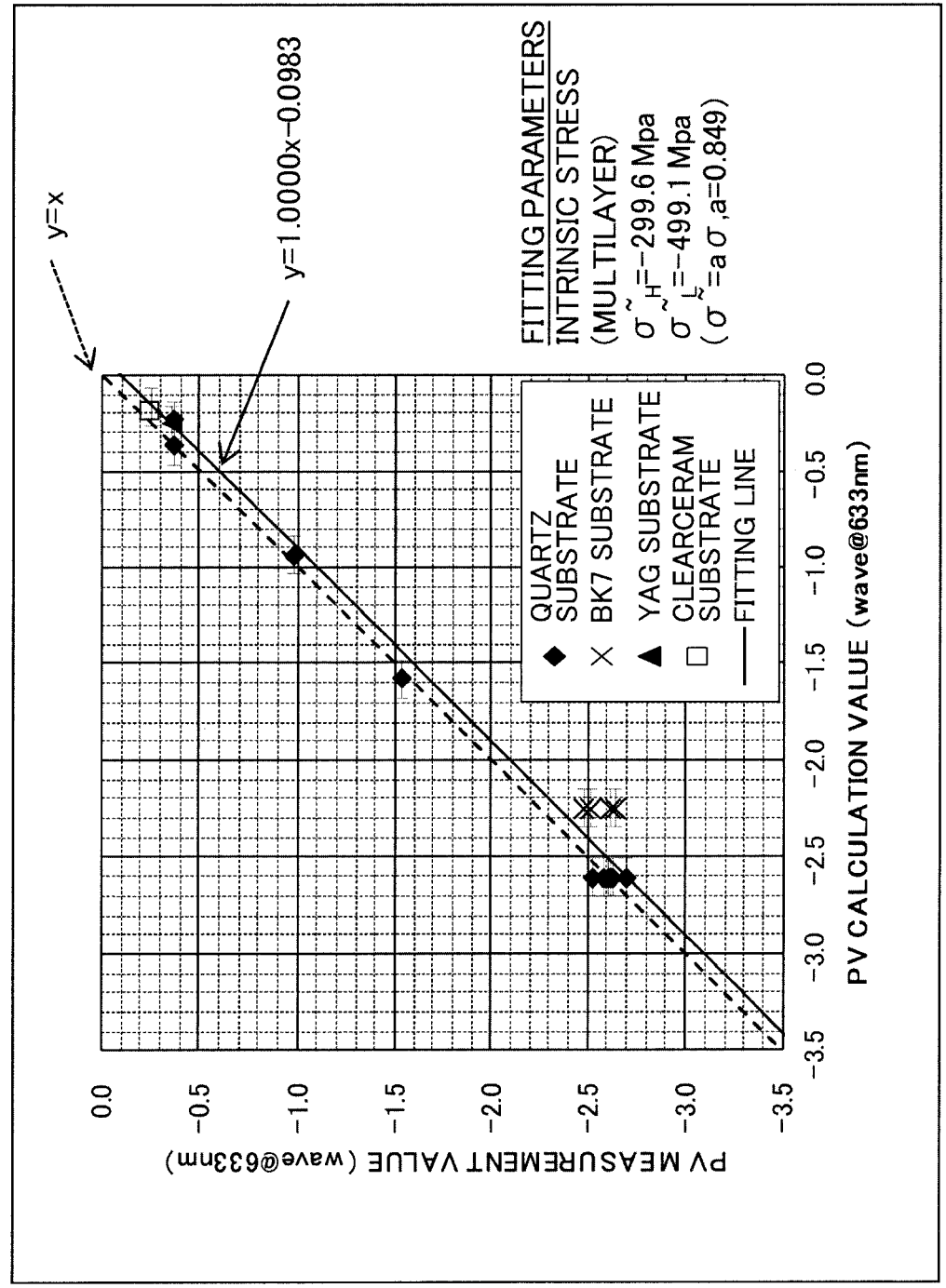
FIG. 4 is a graph similar to FIG. 3, showing bending calculation values at a first adjustment stage.

As shown in FIG. 4, when the first fitting parameter a is increased or decreased, each PV calculation value changes from the initial value to a value at a first adjustment stage, and thus the slope of the above reference line changes. Accordingly, the control means 8 determines the first fitting parameter a so that the slope of the reference line becomes as close to 1 as possible. Here, the control means 8 determines the first fitting parameter as a=0.849. At this time, the reference line is represented by y=1.0000x−0.0983 and thus becomes close to the coincidence line.

It is noted that intrinsic stress an applied to the multilayer film is defined as aσ=σ˜ ("~" should be originally written directly above "σ", but a notation "σ˜" is used as necessary, due to constraints in writing expression), and σ˜$_H$ for the high refractive index layer is −229.6 [MPa] and σ˜$_L$ for the low refractive index layer is −499.1 [MPa].

Next, the control means 8 optimizes the second fitting parameter T$_d$ (step S5).

The second fitting parameter T$_d$ relates to a thermal stress term corresponding to a temperature dependent term for film stress, and indicates the influence of temperature. Taking the second fitting parameter T$_d$ into consideration (i.e., not being equal to the room temperature T) corresponds to introducing the thermal stress term in film stress. The introduction of the thermal stress term relaxes the influence due to the type of the substrate.

Figure 5:
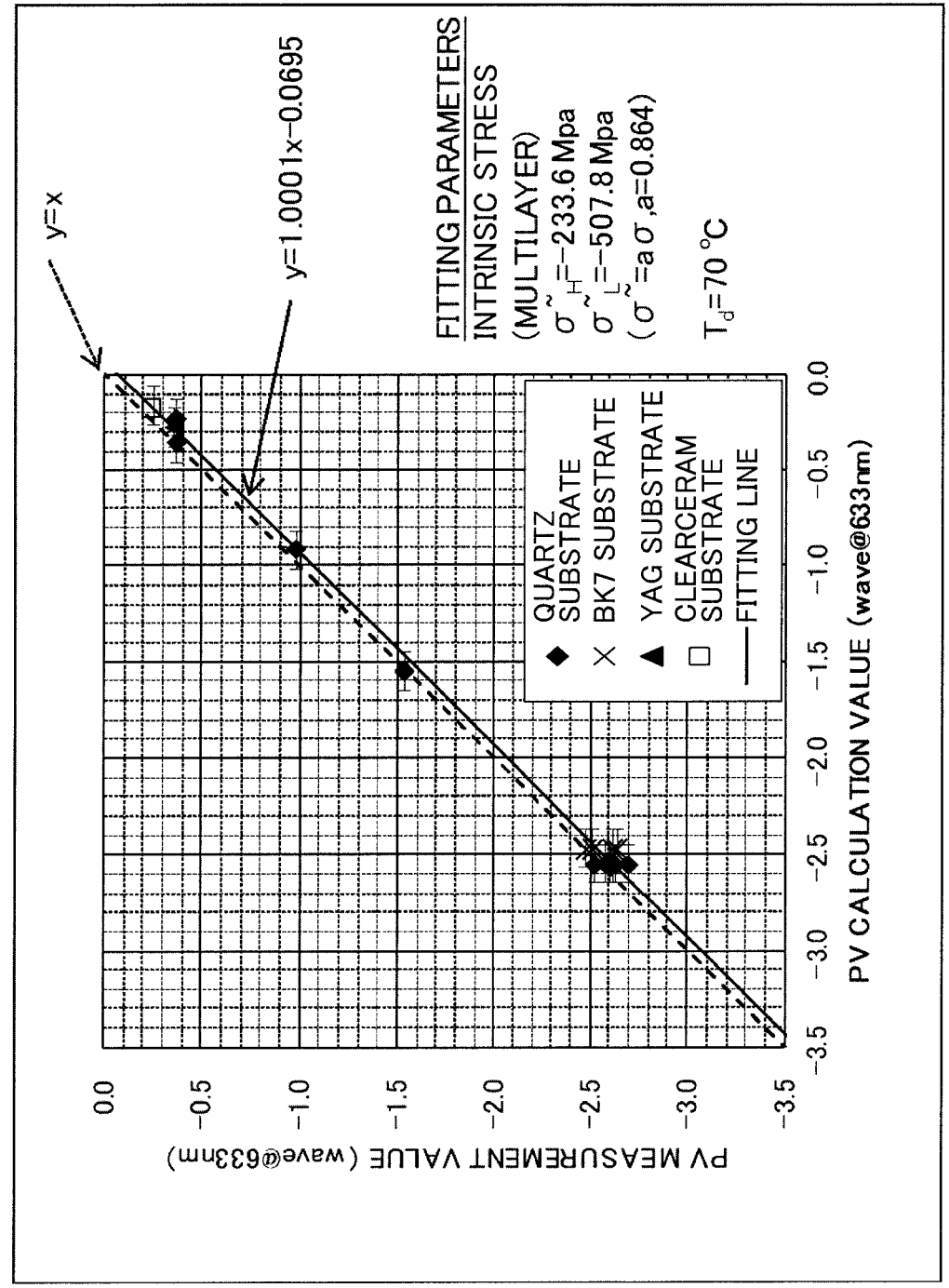
FIG. 5 is a graph similar to FIG. 3, showing bending calculation values at a second adjustment stage.

As shown in FIG. 5, when the second fitting parameter T$_d$ is increased or decreased, each PV calculation value changes from the value at the first adjustment stage to a value at the second adjustment stage and thus the slope of the above reference line changes. Accordingly, the control means 8 determines the second fitting parameter T$_d$ so that the slope of the reference line becomes further close to 1 or becomes 1. Here, the control means 8 determines the values a and T$_d$ as a=0.864 and T$_d$=70 [° C.]. At this time, the reference line is represented by y=1.0001x−0.0695 and thus becomes further close to the coincidence line.

Subsequently, the control means 8 optimizes the third fitting parameter δ$_s$ (step S6).

The third fitting parameter δ$_s$ indicates system error such as the influence of the substrate.

Figure 6:
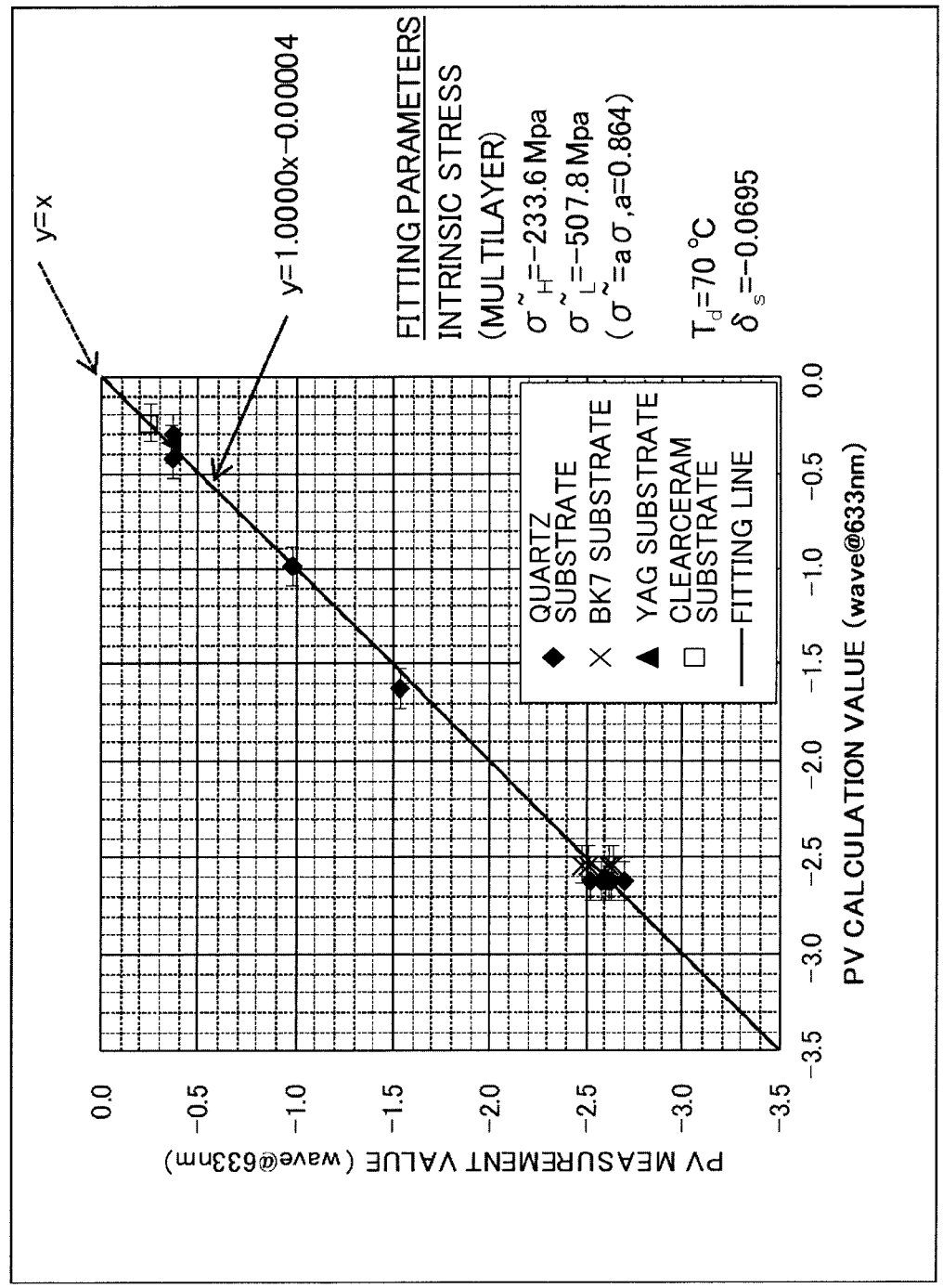
FIG. 6 is a graph similar to FIG. 3, showing bending calculation values at a third adjustment stage.

As shown in FIG. 6, when the third fitting parameter δ$_s$ is increased or decreased, each PV calculation value changes from the value at the second adjustment stage to a value at a third adjustment stage and thus the intercept of the above reference line changes. Accordingly, the control means 8 determines the third fitting parameter δ$_s$ so that the intercept of the reference line becomes 0. Here, the control means 8 determines the third fitting parameter as δ$_s$=−0.0695. At this time, the reference line is represented by y=1.0000x−0.00004 and thus becomes further close to the coincidence line.

It is noted that step S6 may be omitted, i.e., optimization of the third fitting parameter δ$_s$ may not necessarily be performed.

In this way, Expressions (7) to (15) are optimized for the coating condition I, and thereafter, quantitative bending δ of a substrate on which a film is formed with the coating condition I is predicted accurately.

Figure 7:
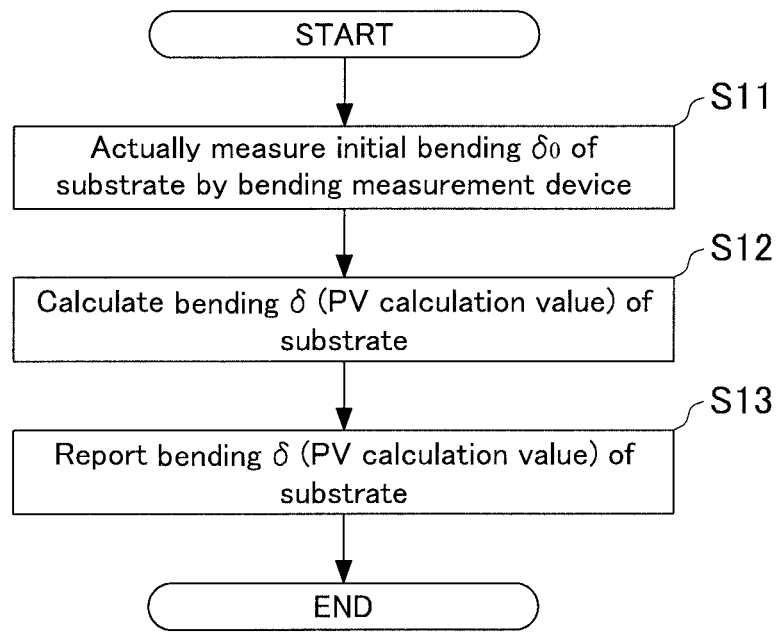
FIG. 7 is a flowchart showing an operation example of bending prediction in the optical product bending prediction device (an example of bending prediction in the optical product bending prediction method) according to the first embodiment of the present invention.

That is, as shown in FIG. 7, initial bending δ$_0$ of the substrate on which a film has not been formed yet is actually measured by the bending measurement device (step S11). Thereafter, for the substrate having the initial bending δ$_0$, bending δ of the substrate is calculated while the film stress changes a deformation force component. It is noted that step S11 may be omitted.

Next, various design values or property values are substituted into Expressions (7) to (15) optimized with the fitting parameters determined in advance, whereby bending δ (PV calculation value) of the substrate is calculated (step S12). In particular, thermal stress is taken into consideration as shown in the second term of the right-hand side of Expression (8). Thus, the influence on the bending δ due to heating coating is reflected, whereby the bending δ is calculated more accurately.

Then, the calculated bending δ (PV calculation value) of the substrate is reported to a user by, for example, being displayed on the display means 2 (step S13). Instead of step S13 or in addition to step S13, a step of transmitting the calculated bending δ (PV calculation value) of the substrate to another device via the communication means 7 may be provided.

Figure 8:
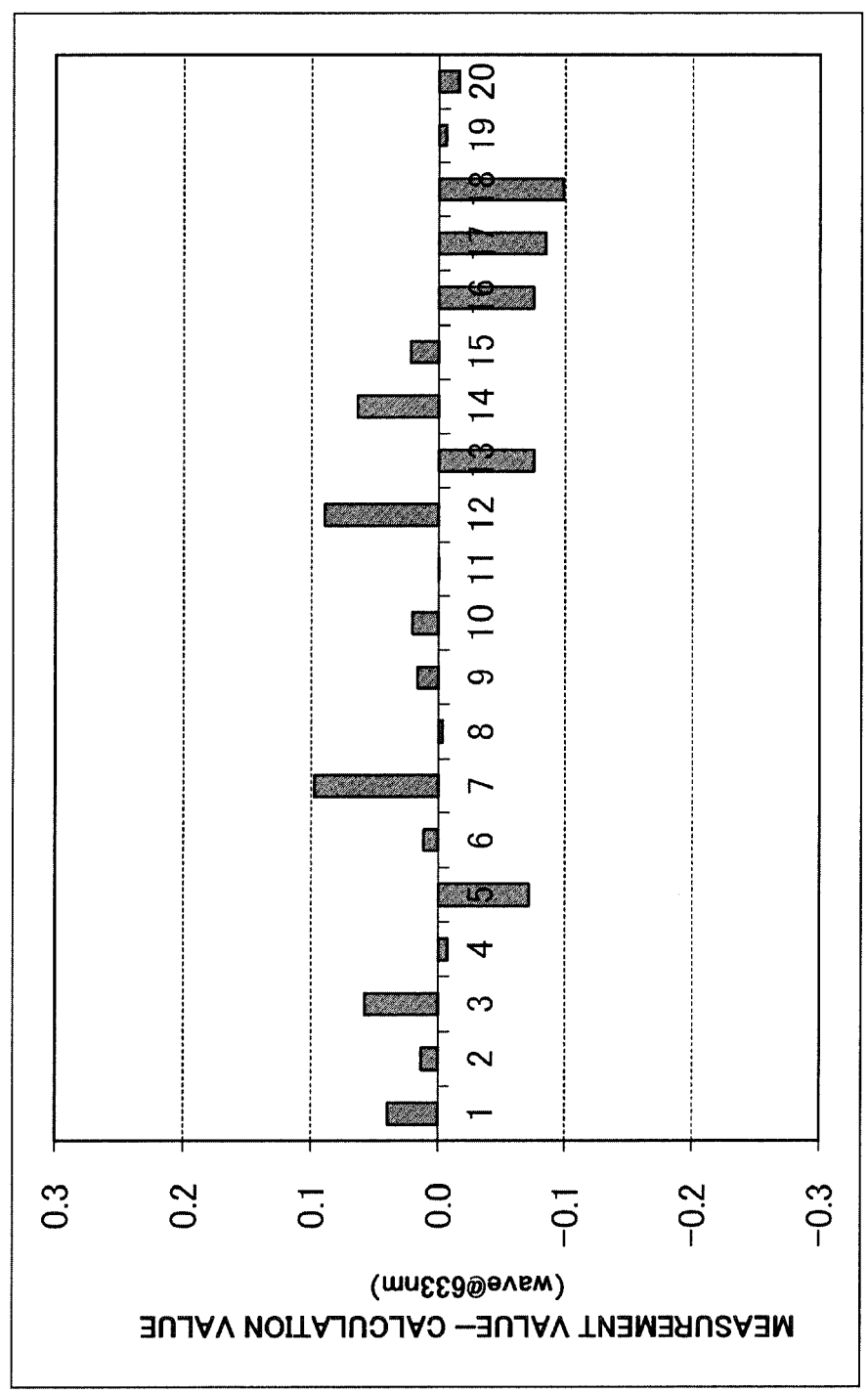
FIG. 8 is a graph showing accuracy (prediction accuracy) of bending calculation values calculated in the first embodiment of the present invention.

FIG. 8 is a graph showing accuracy (prediction accuracy) of the calculated bending δ (PV calculation value). That is, differences when the PV calculation values obtained by substituting the respective design values (Nos. 1 to 20) into the optimized Expressions (7) to (15) are subtracted from the PV measurement values actually measured and shown in a "Measured flatness" column in the above [Table 1], are kept within a range of ±0.1λ as shown in FIG. 8 with the differences set on the vertical axis and Nos. 1 to 20 set on the horizontal axis.

In a case where the bending prediction program and the film designing program are coordinated with each other as described above, it is possible to refer to accurate bending of the substrate having the film immediately during or at the completion of film designing by the film designing program.

Figure 9:
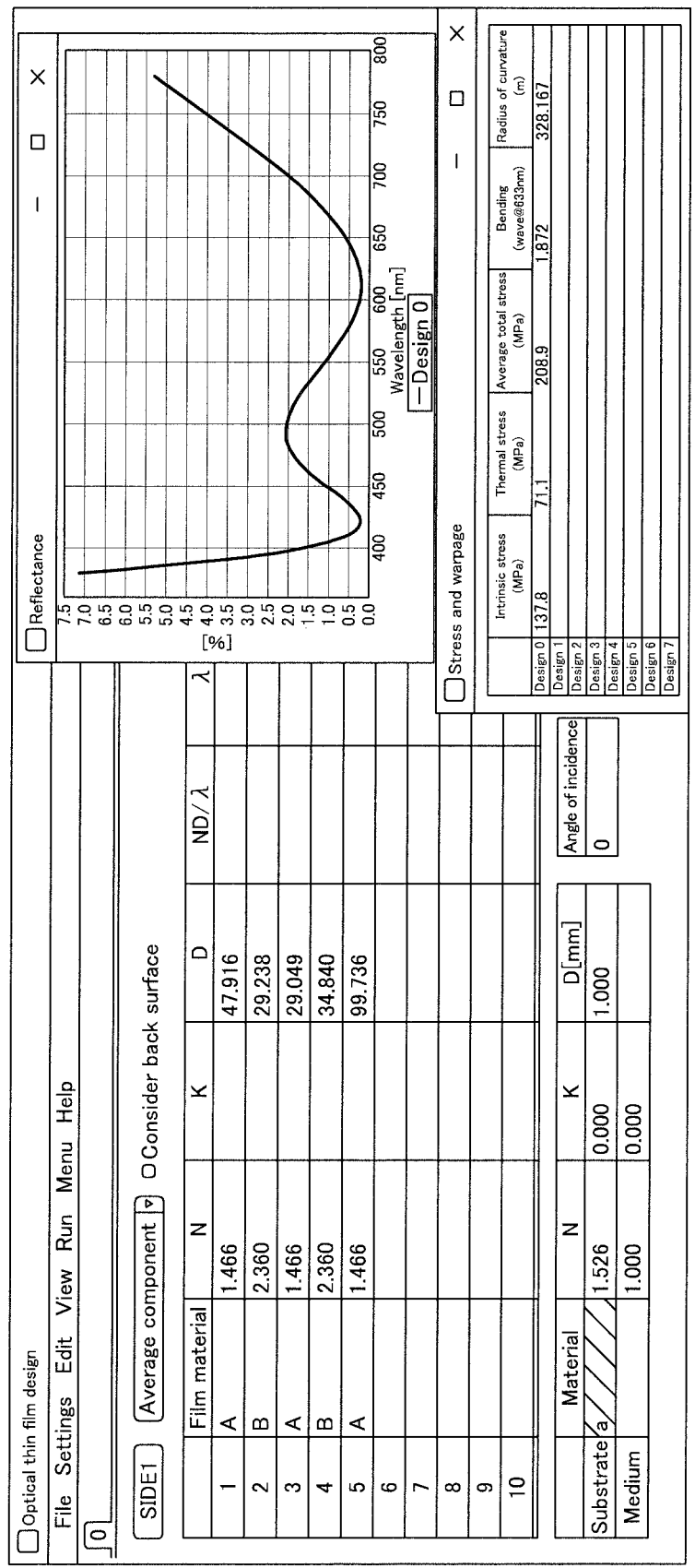
FIG. 9 is an image showing an example of a screen displayed in a case where a bending prediction program and a film designing program are coordinated with each other in the first embodiment of the present invention.

FIG. 9 shows an example of a screen displayed in this case.

That is, in a "0" tab of an "Optical thin film design" window at the left of the screen based on the film designing program, a film (antireflection film) alternately including a total of five layers constituted of a film material A (SiO$_2$) and a film material B (Ta$_2$O$_5$) is designed in a state of having a refractive index shown in an "N" column and a physical film thickness [nm] shown in a "D" column, through input of numerical values and the like. Then, when the kind of a material (on the screen, "a", i.e., BK7 in this case) and the thickness "D" [mm] which are information about the substrate are input, the following are displayed regarding a "Design 0" which is a design in the "0" tab. That is, on a "Reflectance" window at the upper right of the screen, a reflectance distribution in a visible wavelength range for the antireflection film is displayed on the basis of calculation by the control means. In addition, on a "Stress and bending" window at the lower right of the screen, intrinsic stress [MPa], thermal stress [MPa], average total stress [MPa], bending (λ=633 nm), and a radius of curvature [m] for the antireflection film are displayed on the basis of calculation by the control means executing the bending prediction program. The radius of curvature can be calculated from the bending and the size of the substrate.

In addition, when a user similarly performs inputs on a newly created "1" tab while keeping inputs on the "0" tab, the user can view and compare the bending and the like for the "Design 0" and the bending and the like for a "Design 1" on the "Stress and bending" window. Further, if the user sequentially performs inputs similarly on a newly created "2" tab and the like, the user can view and compare the bending and the like among three or more kinds of designs.

Moreover, by checking a "Consider back surface" box on the "Optical thin film design" window, the user can confirm a reflectance distribution, bending, and the like, considering the back surface. Inputs for the design of a film on the front surface can be performed on a "SIDE 1" as shown in FIG. 9, and inputs for the design of a film on the back surface can be performed on a newly created "SIDE 2".

A "Medium" shown at the bottom side part of the "Optical thin film design" window indicates a material around the optical product, and in FIG. 9, the refractive index of the medium is set as N=1.000, i.e., air is designated.

It is noted that the refractive index may be automatically set in accordance with the input in the "Film material" column. In addition, the processing and display of the reflectance window may be omitted.

Next, optimization of the fitting parameters in a coating device D2 for forming a multilayer film by alternately depositing $Ta_2O_5$ which is a high refractive index material and $SiO_2$ which is a low refractive index material, will be described. In the coating device D2, the vacuum degree of a chamber for deposition is set to about $9\times10^{-4}$ Pa, the substrate is separately heated at 200° C., oxygen ($O_2$) gas is introduced at a constant flow rate into the chamber, and ion assist is performed. Hereinafter, such a coating condition is referred to as coating condition II.

Optimization of the fitting parameters in the coating condition II is performed as follows. As in the case of the coating condition I, from the design values of each sample (step S1), the PV calculation value is calculated (step S2), and bending of an optical product manufactured by forming a multilayer film on a substrate in accordance with the design values is actually measured to obtain the PV measurement value (step S3). Then, the fitting parameters are determined so that the PV calculation value is fitted to the PV measurement value in each sample (steps S4 to S6).

The following [Table 2] shows the samples (nine examples Nos. 1 to 9) in the coating condition II. It is noted that, for both of the PV calculation value and the PV measurement value, λ=633 nm is used as a reference.

TABLE 2

| | Substrate | | | | Film (Unit of film thickness: μm) | | | Measured |
|---|---|---|---|---|---|---|---|---|
| Glass No. | material | Flatness | Diameter (mm) | Thickness (mm) | Number of layers | Total film thickness | H film thickness | L film thickness | flatness PV |
| 1 | Synthetic quartz | −0.095λ | 30 | 3 | 14 | 1.0 | 0.4 | 0.6 | −0.242λ |
| 2 | BK7 | −0.083λ | 30 | 3 | 14 | 1.0 | 0.4 | 0.6 | −0.370λ |
| 3 | Synthetic quartz | −0.071λ | 30 | 3 | 43 | 4.9 | 1.9 | 3.1 | −0.755λ |
| 4 | BK7 | −0.042λ | 30 | 3 | 43 | 4.9 | 1.9 | 3.1 | −1.468λ |
| 5 | Synthetic quartz | 0.085λ | 30 | 3 | 14 | 3.2 | 1.3 | 1.9 | −0.376λ |
| 6 | BK7 | 0.061λ | 30 | 3 | 14 | 3.2 | 1.3 | 1.9 | −0.912λ |
| 7 | Synthetic quartz | 0.099λ | 30 | 3 | 34 | 6.0 | 1.4 | 4.6 | −0.876λ |
| 8 | BK7 | −0.195λ | 30 | 3 | 34 | 6.0 | 1.4 | 4.6 | −1.945λ |
| 9 | Synthetic quartz | 0.074λ | 50.8 | 12 | 34 | 6.0 | 1.4 | 4.6 | −0.186λ |

Figure 10:
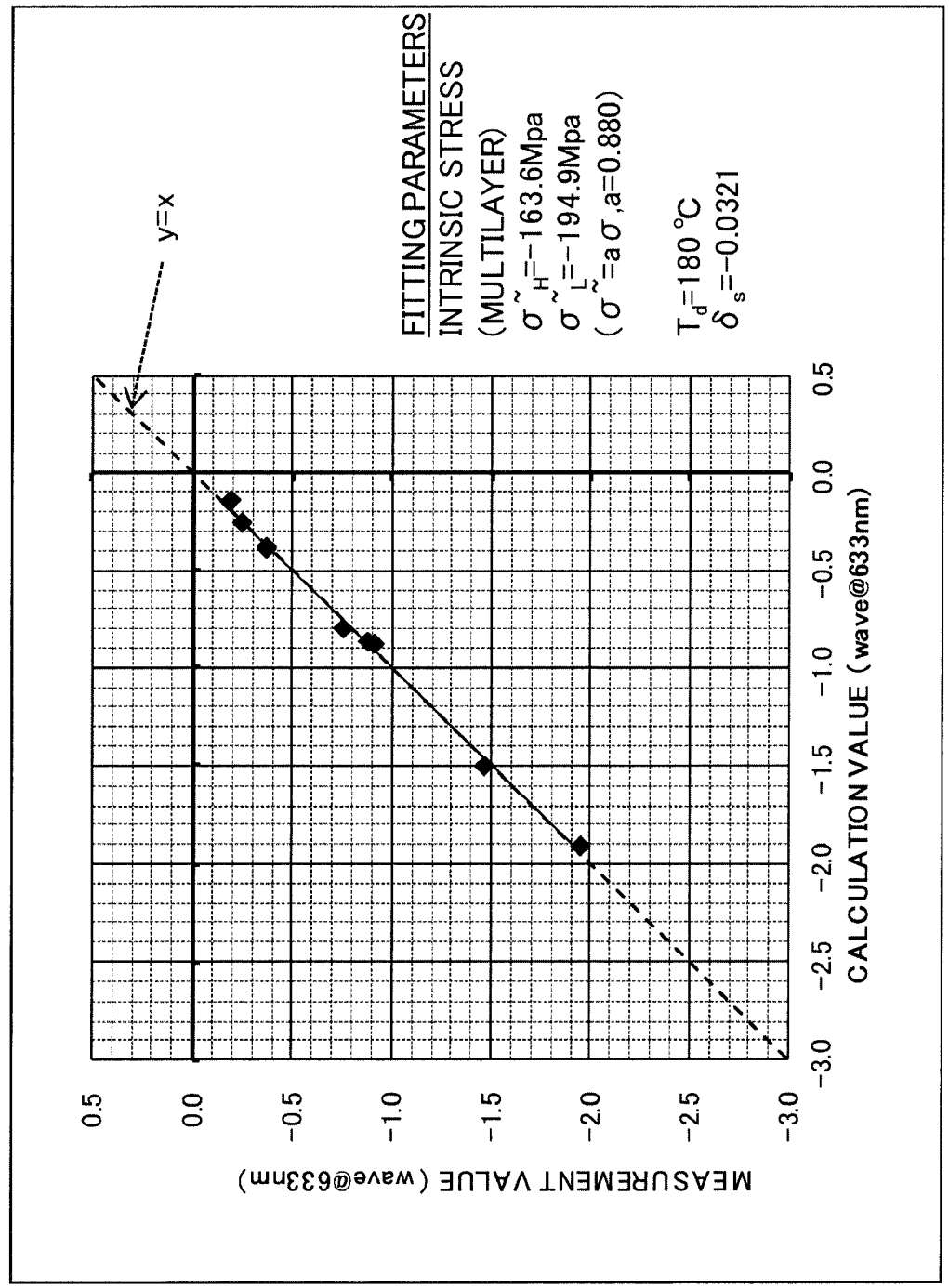
FIG. 10 is a graph similar to FIG. 6, in a coating condition II, according to the first embodiment of the present invention.

When the bending calculation values have reached the third adjustment stage (step S6), the relationship between the PV calculation value and the PV measurement value in the coating condition II is as shown in FIG. 10. In the coating condition II, the first fitting parameter a becomes 0.880, the second fitting parameter $T_d$ becomes 180 [° C.], and the third fitting parameter $\delta_s$ becomes −0.0321. In addition, in the coating condition II, the intrinsic stress $\sigma_H$ for $Ta_2O_5$ becomes −163.6 [MPa], and the intrinsic stress $\sigma_L$ for $SiO_2$ becomes −194.9 [MPa].

With Expressions (7) to (15) optimized in the coating condition II as described above, thereafter, quantitative bending δ of the substrate on which a film is formed in the coating condition II is accurately predicted (steps S11 to 13).

Figure 11:
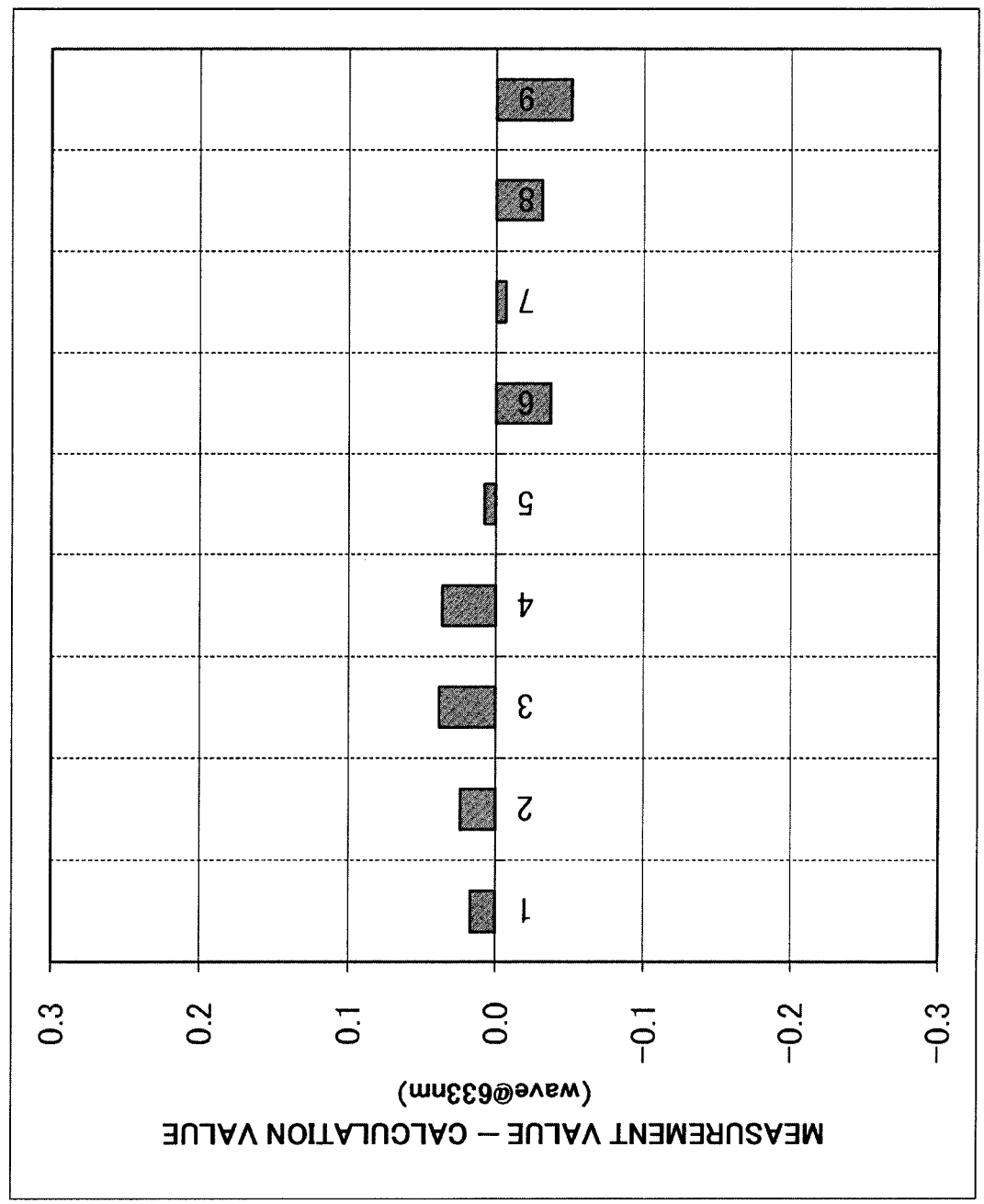
FIG. 11 is a graph similar to FIG. 8, in the coating condition II, according to the first embodiment of the present invention.

FIG. 11 is a graph showing accuracy (prediction accuracy) for the bending δ (PV calculation value) calculated in the coating condition II. That is, differences when the PV calculation values obtained by substituting the respective design values (Nos. 1 to 9) in [Table 2] into the optimized Expressions (7) to (15) are subtracted from the PV measurement values actually measured and shown in a "Measured flatness" column in [Table 2], are kept within a range of ±0.1λ as shown in FIG. 11 with the differences set on the vertical axis and Nos. 1 to 9 set on the horizontal axis.

Next, optimization of the fitting parameters in a coating condition III in which the high refractive index material is changed to $Nb_2O_5$ in the above coating device D2 will be described. The low refractive index material is not changed, i.e., remains $SiO_2$, and also, the high refractive index material and the low refractive index material are alternately deposited in the same manner. In the coating condition III, the vacuum degree of a chamber for deposition is set to about $9\times10^{-4}$ Pa, the substrate is separately heated at 150° C., oxygen ($O_2$) gas is introduced at a constant flow rate into the chamber, and ion assist is performed.

Optimization of the fitting parameters in the coating condition III is performed as follows. As in the case of the coating conditions I and II, from the design values of each sample (step S1), the PV calculation value is calculated (step S2), and bending of an optical product manufactured by forming a multilayer film on a substrate in accordance with the design values is actually measured to obtain the PV measurement value (step S3). Then, the fitting parameters are determined so that the PV calculation value is fitted to the PV measurement value in each sample (steps S4 to S6).

The following [Table 3] shows the samples (twenty-one examples Nos. 1 to 21) in the coating condition III. It is noted that, for both of the PV calculation value and the PV measurement value, λ=633 nm is used as a reference.

The bending prediction program may be incorporated into the film designing program or may be able to be coordinated with the film designing program, so as to be able to refer to the design values of the film (the kind of the high refractive index material and the total film thickness of the high refractive index layer, and the kind of the low refractive

TABLE 3

| | Substrate | | | | Film (Unit of film thickness: μm) | | | Measured |
|---|---|---|---|---|---|---|---|---|
| Glass No. | material | Flatness | Diameter (mm) | Thickness (mm) | Number of layers | Total film thickness | H film thickness | L film thickness | flatness PV |
| 1 | Synthetic quartz | −0.084λ | 30 | 3 | 30 | 4.0 | 1.5 | 2.5 | −0.657λ |
| 2 | BK7 | 0.049λ | 30 | 3 | 30 | 4.0 | 1.5 | 2.5 | −1.017λ |
| 3 | Synthetic quartz | 0.063λ | 30 | 3 | 18 | 2.6 | 1.0 | 1.6 | −0.337λ |
| 4 | Synthetic quartz | 0.066λ | 30 | 3 | 18 | 2.6 | 1.0 | 1.6 | −0.349λ |
| 5 | BK7 | −0.079λ | 30 | 3 | 18 | 2.6 | 1.0 | 1.6 | −0.725λ |
| 6 | BK7 | −0.078λ | 30 | 3 | 18 | 2.6 | 1.0 | 1.6 | −0.734λ |
| 7 | BK7 | −0.105λ | 30 | 3 | 77 | 9.2 | 3.4 | 5.9 | −2.460λ |
| 8 | BK7 | 0.068λ | 30 | 3 | 77 | 9.2 | 3.4 | 5.9 | −2.365λ |
| 9 | Synthetic quartz | −0.085λ | 30 | 3 | 77 | 9.2 | 3.4 | 5.9 | −1.497λ |
| 10 | Synthetic quartz | −0.074λ | 30 | 3 | 77 | 9.2 | 3.4 | 5.9 | −1.484λ |
| 11 | Synthetic quartz | −0.074λ | 30 | 3 | 79 | 9.7 | 3.7 | 6.0 | −1.496λ |
| 12 | BK7 | 0.085λ | 30 | 3 | 79 | 9.7 | 3.7 | 6.0 | −2.406λ |
| 13 | Synthetic quartz | 0.062λ | 30 | 3 | 46 | 5.2 | 1.7 | 3.5 | −0.753λ |
| 14 | BK7 | 0.051λ | 30 | 3 | 46 | 5.2 | 1.7 | 3.5 | −1.265λ |
| 15 | Synthetic quartz | 0.044λ | 25.4 | 5 | 46 | 5.2 | 1.7 | 3.5 | −0.210λ |
| 16 | Synthetic quartz | 0.071λ | 30 | 5 | 46 | 5.2 | 1.7 | 3.5 | −0.244λ |
| 17 | Synthetic quartz | 0.043λ | 50 | 5 | 46 | 5.2 | 1.7 | 3.5 | −0.823λ |
| 18 | Synthetic quartz | 0.078λ | 30 | 3 | 33 | 2.7 | 1.1 | 1.6 | −0.351λ |
| 19 | BK7 | −0.067λ | 30 | 3 | 33 | 2.7 | 1.1 | 1.6 | −0.706λ |
| 20 | Synthetic quartz | 0.109λ | 30 | 3 | 52 | 5.1 | 1.4 | 3.8 | −0.704λ |
| 21 | BK7 | 0.046λ | 30 | 3 | 52 | 5.1 | 1.4 | 3.8 | −1.268λ |

Figure 12:
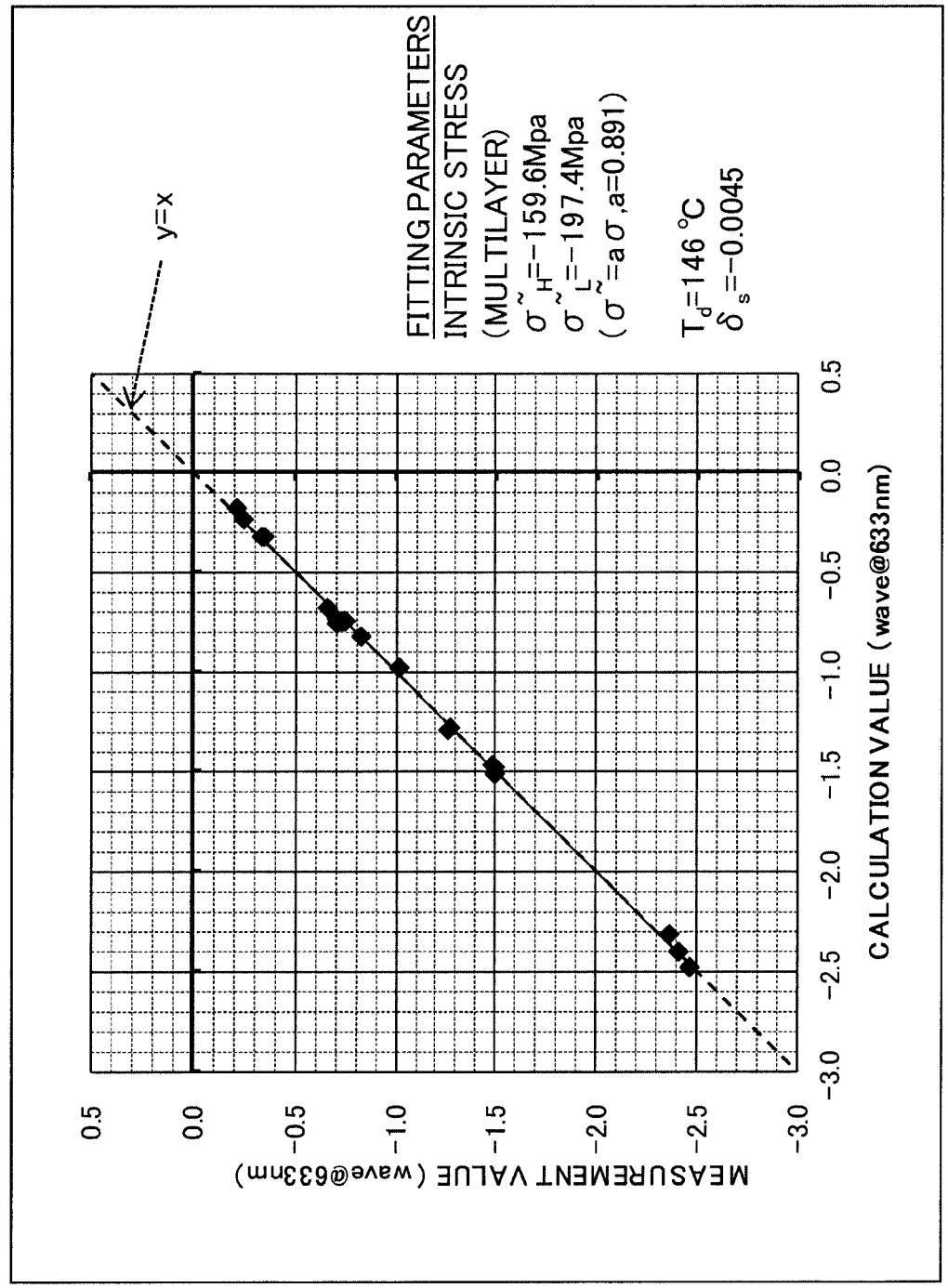
FIG. 12 is a graph similar to FIG. 6, in a coating condition III, according to the first embodiment of the present invention.

When the bending calculation values have reached the third adjustment stage (step S6), the relationship between the PV calculation value and the PV measurement value in the coating condition III is as shown in FIG. 12. In the coating condition III, the first fitting parameter a becomes 0.891, the second fitting parameter $T_d$ becomes 146 [° C.], and the third fitting parameter $\delta_s$ becomes −0.0045. In addition, in the coating condition III, the intrinsic stress $\tilde{\sigma}_H$ for $Nb_2O_5$ becomes −159.4 [MPa], and the intrinsic stress $\tilde{\sigma}_L$ for $SiO_2$ becomes −197.4 [MPa].

With Expressions (7) to (15) optimized in the coating condition III as described above, thereafter, quantitative bending δ of the substrate on which a film is formed in the coating condition III is accurately predicted (steps S11 to S13).

Figure 13:
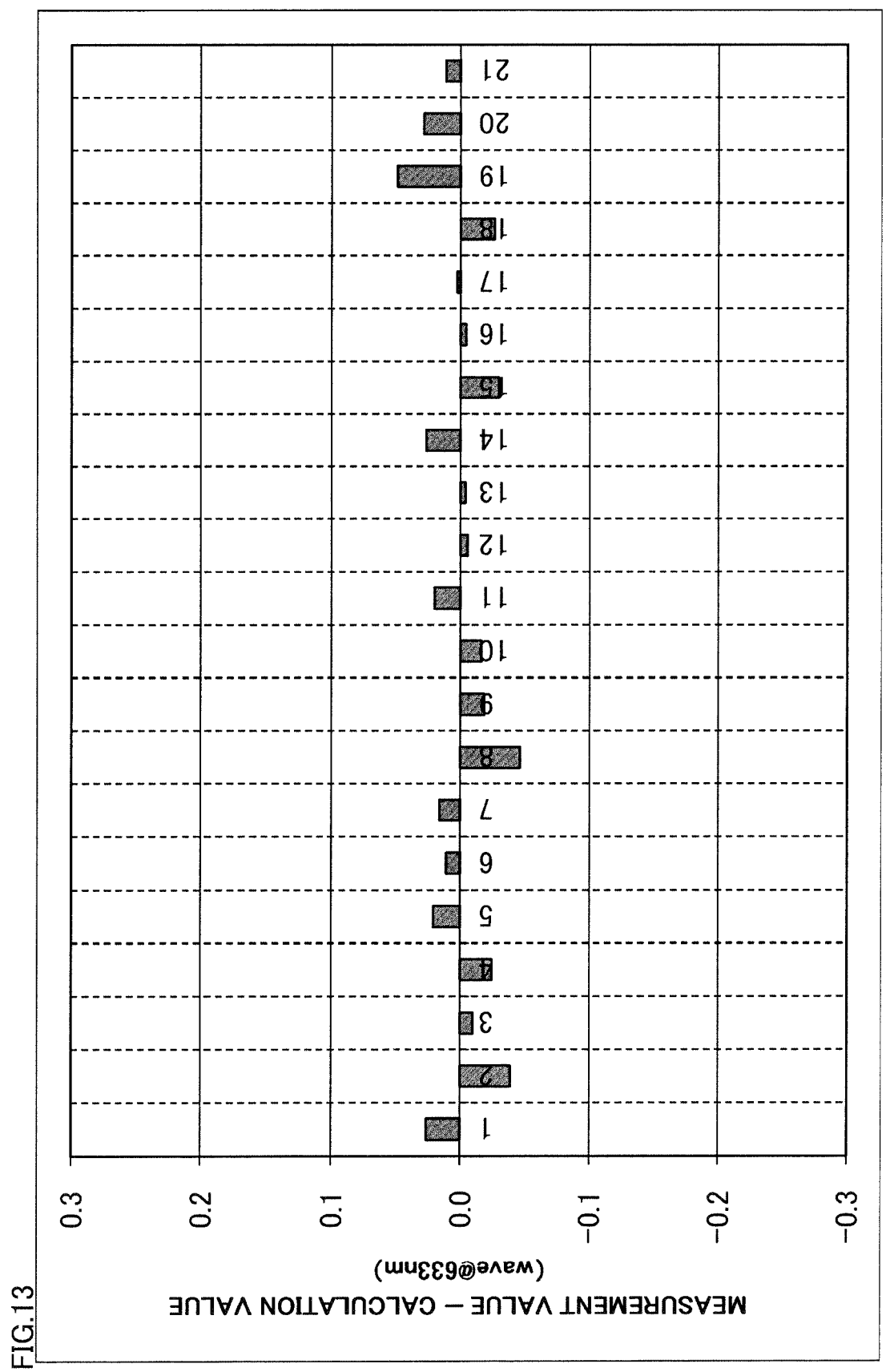
FIG. 13 is a graph similar to FIG. 8, in the coating condition III, according to the first embodiment of the present invention.

FIG. 13 is a graph showing accuracy (prediction accuracy) for the bending δ (PV calculation value) calculated in the coating condition III. That is, differences when the PV calculation values obtained by substituting the respective design values (Nos. 1 to 21) in [Table 3] into the optimized Expressions (7) to (15) are subtracted from the PV measurement values actually measured and shown in a "Measured flatness" column in [Table 3], are kept within a range of ±0.1λ as shown in FIG. 13 with the differences set on the vertical axis and Nos. 1 to 21 set on the horizontal axis.

As described above, the bending prediction method, the bending prediction program, and the bending prediction device 1 for executing the program are provided with Expressions (7) to (15) for which the first to third fitting parameters are optimized in advance for each coating condition such as the coating conditions I to III. Thereby, under the same coating condition, it is possible to quantitatively evaluate the bending δ irrespective of the kind of the substrate, the size of the substrate, or the number of film layers, without manufacturing the optical product and actually measuring bending.

index material and the total film thickness of the low refractive index layer). In this case, it is possible to calculate the bending δ in accordance with inputs of the design values to the film designing program, and display the result on the display means 2 or the like, thus enhancing convenience.

In the coating conditions I to III, the stress is compressive stress and thus the bending δ occurs so as to protrude on the film formed surface side. However, also in a case where the stress is tensile stress and thus the bending δ occurs so as to be recessed on the film formed surface side, and in a case where the stress includes compressive stress and tensile stress in a mixed manner and thus the bending δ is determined on the basis of the balance therebetween, the bending δ is calculated in the same manner, depending on the signs of the stress and the bending δ.

That is, in the optical product bending prediction method according to the first embodiment of the present invention, bending δ of a substrate having a film is predicted by the computer performing calculation (steps S11 to S13) of Expressions (7) to (15) in which a is set as the first fitting parameter, $T_d$ is set as the second fitting parameter, and $\delta_s$ is set as the third fitting parameter, and these parameters have been optimized in each coating condition I to III using a plurality of samples (steps S1 to S6). Thus, it is possible to predict the bending δ of the substrate more accurately than that in the conventional art, and once Expressions (7) to (15) are optimized by a plurality of samples, thereafter, accurate bending δ is obtained through calculation without manufacturing samples in each time, whereby an optical product with no bending δ (having bending δ to a desired extent) can be easily manufactured at low cost. It is noted that Expression (7) corresponds to Expression (A4) in the claims, as described above.

Even in a case where the third fitting parameter $\delta_s$ and the initial bending $\delta_0$ of the substrate are not taken into consideration in Expression (7) (corresponding to Expression (A1) in the claims), as the stress, intrinsic stress and also thermal stress are reflected in Expression (8) and the first and second fitting parameters, whereby it is possible to predict the bending δ of the substrate more accurately than that in the conventional art. Similarly, even in a case where the third fitting parameter $δ_s$ is taken into consideration but the initial bending $δ_0$ of the substrate is not taken into consideration (corresponding to Expression (A2) in the claims), it is possible to predict the bending δ of the substrate more accurately than that in the conventional art, owing to the introduction of the third fitting parameter $δ_s$. In addition, even in a case where the initial bending $δ_0$ of the substrate is taken into consideration but the third fitting parameter $δ_s$ is not taken into consideration (corresponding to Expression (A3) in the claims), it is possible to predict the bending δ of the substrate more accurately than that in the conventional art, owing to the introduction of the initial bending $δ_0$ of the substrate.

Further, the optical product bending prediction program according to the first embodiment of the present invention forms, through execution thereof by the computer, the control means 8 which is capable of referring to storage in the storage means 6 about Expressions (7) to (15) in which a is set as the first fitting parameter, $T_d$ is set as the second fitting parameter, and $δ_s$ is set as the third fitting parameter, and these parameters have been optimized in each coating condition I to III using a plurality of samples, and predicts the bending δ of the substrate having the film through calculation of Expressions (7) to (15). Thus, the bending prediction program enables the computer to form the control means 8 capable of predicting the bending δ of the substrate more accurately than that in the conventional art, and once Expressions (7) to (15) are optimized by a plurality of samples, thereafter, accurate bending δ is obtained through calculation without manufacturing samples in each time, whereby an optical product with no bending δ (having bending δ to a desired extent) can be easily manufactured at low cost.

Even in a case where the third fitting parameter $δ_s$ and the initial bending $δ_0$ of the substrate are not taken into consideration in Expression (7) (corresponding to Expression (A1) in the claims), as the stress, intrinsic stress and also thermal stress are reflected in Expression (8) and the first and second fitting parameters, whereby the control means 8 capable of predicting the bending δ of the substrate more accurately than that in the conventional art is formed by the computer. Similarly, even in a case where the third fitting parameter $δ_s$ is taken into consideration but the initial bending $δ_0$ of the substrate is not taken into consideration (corresponding to Expression (A2) in the claims), the control means 8 capable of predicting the bending δ of the substrate more accurately than that in the conventional art is formed by the computer, owing to the introduction of the third fitting parameter $δ_s$. In addition, even in a case where the initial bending $δ_0$ of the substrate is taken into consideration but the third fitting parameter $δ_s$ is not taken into consideration (corresponding to Expression (A3) in the claims), the control means 8 capable of predicting the bending δ of the substrate more accurately than that in the conventional art is formed by the computer, owing to the introduction of the initial bending $δ_0$ of the substrate.

In the above operation example or the like, at least one of the low refractive index material and the high refractive index material in the multilayer film is not limited to that shown in the above example or the like.

The bending δ in a case where films are formed on both surfaces of the substrate may be calculated. In this case, bendings for the respective surfaces may be calculated individually and then combined to obtain overall bending δ. For example, in a case where bending $δ_1$ of a first surface of the substrate calculated in the same manner as in the above operation example is 2λ and bending $δ_2$ of a second surface of the substrate calculated in the same manner is 2λ, the bending $δ_1$ of the first surface and the bending $δ_2$ of the second surface are canceled out as a result of coating on both surfaces of the substrate, so that the overall bending δ may be calculated as 0.

Second Embodiment

A bending prediction device, a bending prediction program, and a bending prediction method according to the second embodiment of the present invention are the same as those in the first embodiment, except for calculation expressions for the bending δ stored in the storage means 6 and a calculation method for the bending δ.

In the second embodiment, Expression (7) in the first embodiment is replaced with Expression (16) (corresponding to Expression (A3)) in which the third fitting parameter is not taken into consideration. In the second embodiment, the third fitting parameter may be taken into consideration, and the initial bending $δ_0$ may not necessarily be taken into consideration.

In the second embodiment, the Expressions (8) and (10) (respectively corresponding to Expressions (B1) and (D)) in the first embodiment are integrated to be replaced with Expression (17) (corresponding to Expression (B2)) in which the first fitting parameter a is separated into a first primary fitting parameter $a_H$ and a first secondary fitting parameter $a_L$, and the first primary fitting parameter $a_H$ is multiplied by $σ_H \tilde{d}_H$, and the first secondary fitting parameter $a_L$ is multiplied $σ_L \tilde{d}_L$.

Expressions (9) to (17) (excluding Expression (10)) are shown below.

[Mathematical 4]

$$\delta = \frac{3l^2}{b^2}\left(\frac{1-v_s}{E_s}\right)d\sigma + \delta_0 \qquad (16)$$

$$\sigma = a_H \sigma_H \tilde{d}_H + a_L \sigma_L \tilde{d}_L + (\alpha_s - \alpha_f)\left(\frac{E_f}{1-v_f}\right)(T - T_d) \qquad (17)$$

$$d = d_H + d_L \qquad (9)$$

$$\tilde{d}_H = d_H/d \qquad (11)$$

$$\tilde{d}_L = d_L/d \qquad (12)$$

$$E_f = \tilde{d}_H E_H + \tilde{d}_L E_L \qquad (13)$$

$$v_f = \tilde{d}_H v_H + \tilde{d}_L v_L \qquad (14)$$

$$\alpha_f = \tilde{d}_H \alpha_H + \tilde{d}_L \alpha_L \qquad (15)$$

In the bending prediction device according to the second embodiment, for each coating device (coating condition), the first primary, first secondary, and second fitting parameters $a_H$, $a_L$, and $T_d$ in Expressions (16) and (17) are optimized in advance on the basis of a plurality of actual measured values of bending, and are stored in the storage means. In Expressions (9) to (17) (excluding Expression (10)) for which the first primary, first secondary, and second fitting parameters have been optimized, various values relevant to the multilayer film in designing in a case of forming the film by the same coating device (same process) are substituted, whereby bending on the multilayer film in designing is quantitatively calculated.

The bending prediction device of the second embodiment operates in the same manner as shown in FIG. 2 corresponding to the operation example in the first embodiment.

Hereinafter, optimization of the first primary, first secondary, and second fitting parameters in the coating device D1 for forming a multilayer film by alternately depositing tantalum pentoxide $Ta_2O_5$ which is a high refractive index material and silicon dioxide $SiO_2$ which is a low refractive index material, will be described. In the coating device D1 of the second embodiment, the film was formed in the above-described coating condition I.

That is, in optimization of the first primary, first secondary, and second fitting parameters, a plurality of samples are designed in advance (step S1).

Then, for each designed sample, the bending $\delta$ (PV calculation value) is provisionally calculated using Expressions (9) to (17) (excluding Expression (10)) with the first primary, first secondary, and second fitting parameters set as $a_H=1$, $a_L=1$, and $T_d=T$ (initial state) (step S2).

Further, each sample is actually manufactured on the basis of the design, and the bending $\delta$ (PV measurement value) of each manufactured sample is actually measured by the bending measurement device (step S3).

Figure 14:
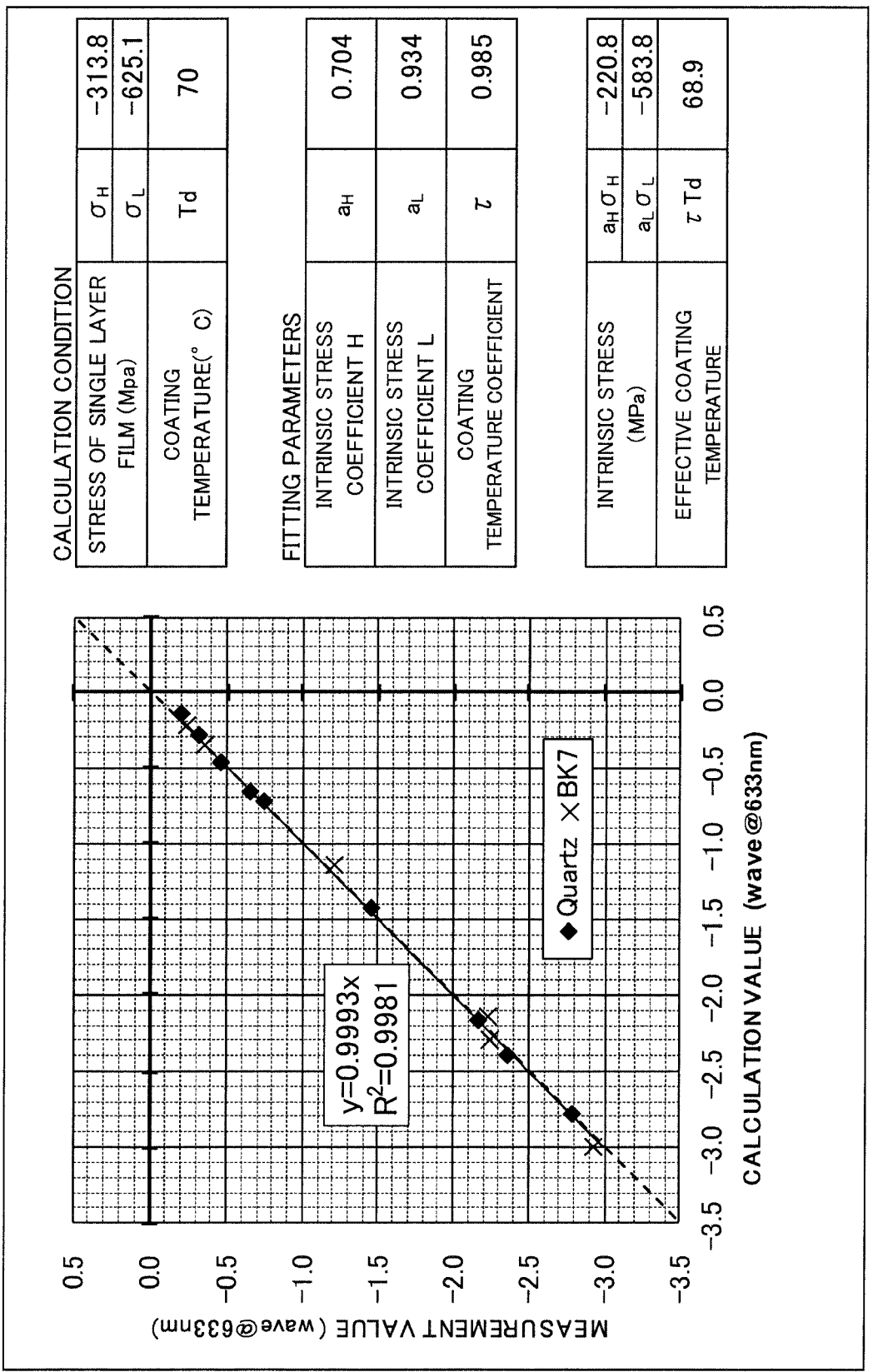
FIG. 14 is a graph similar to FIG. 6, in the coating condition I, according to the second embodiment of the present invention.

The following [Table 4] shows the samples (fifteen examples Nos. 1 to 15) in the coating condition I. It is noted that, for both of the PV calculation value and the PV measurement value, $\lambda=633$ nm is used as a reference.

right in FIG. 14, the intrinsic stress $a_H\sigma_H$ of the high refractive index layer becomes −220.8 [MPa], the intrinsic stress $a_L\sigma_L$ of the low refractive index layer becomes −583.8 [MPa], and the effective coating temperature $T_d$ becomes 68.9 [° C.]. It is noted that Quartz is synthetic quartz and $R^2$ is a coefficient of determination.

Figure 15:
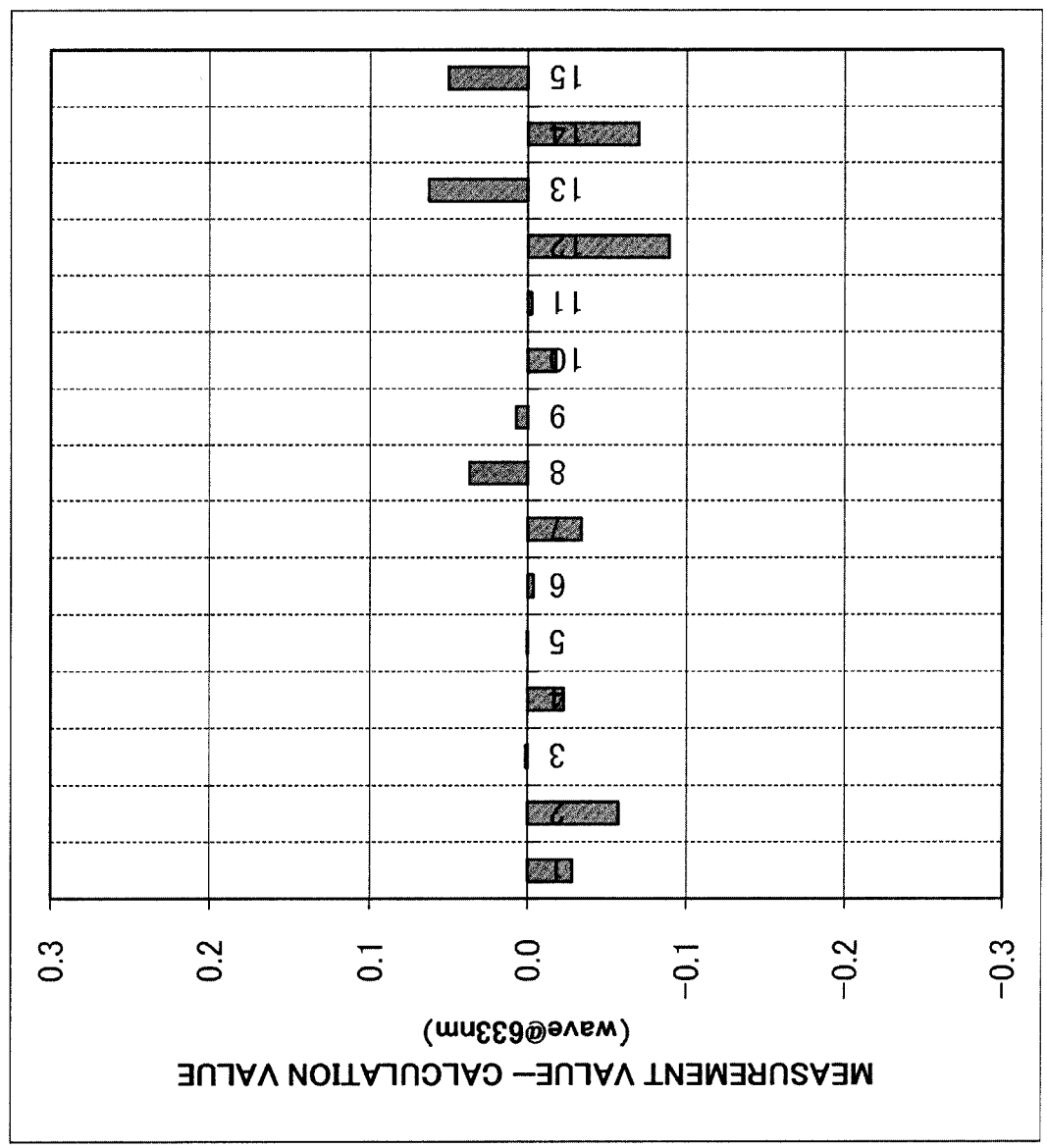
FIG. 15 is a graph similar to FIG. 8, in the coating condition I, according to the second embodiment of the present invention.

In each sample, (PV measurement value−PV calculation value) is kept within a range of ±0.1λ as shown in FIG. 15 with (PV measurement value−PV calculation value) set on the vertical axis and Nos. 1 to 15 set on the horizontal axis, similar to FIG. 8. On the horizontal axis, the samples are arranged in order toward the right side from No. 1 at the left end.

Figure 16:
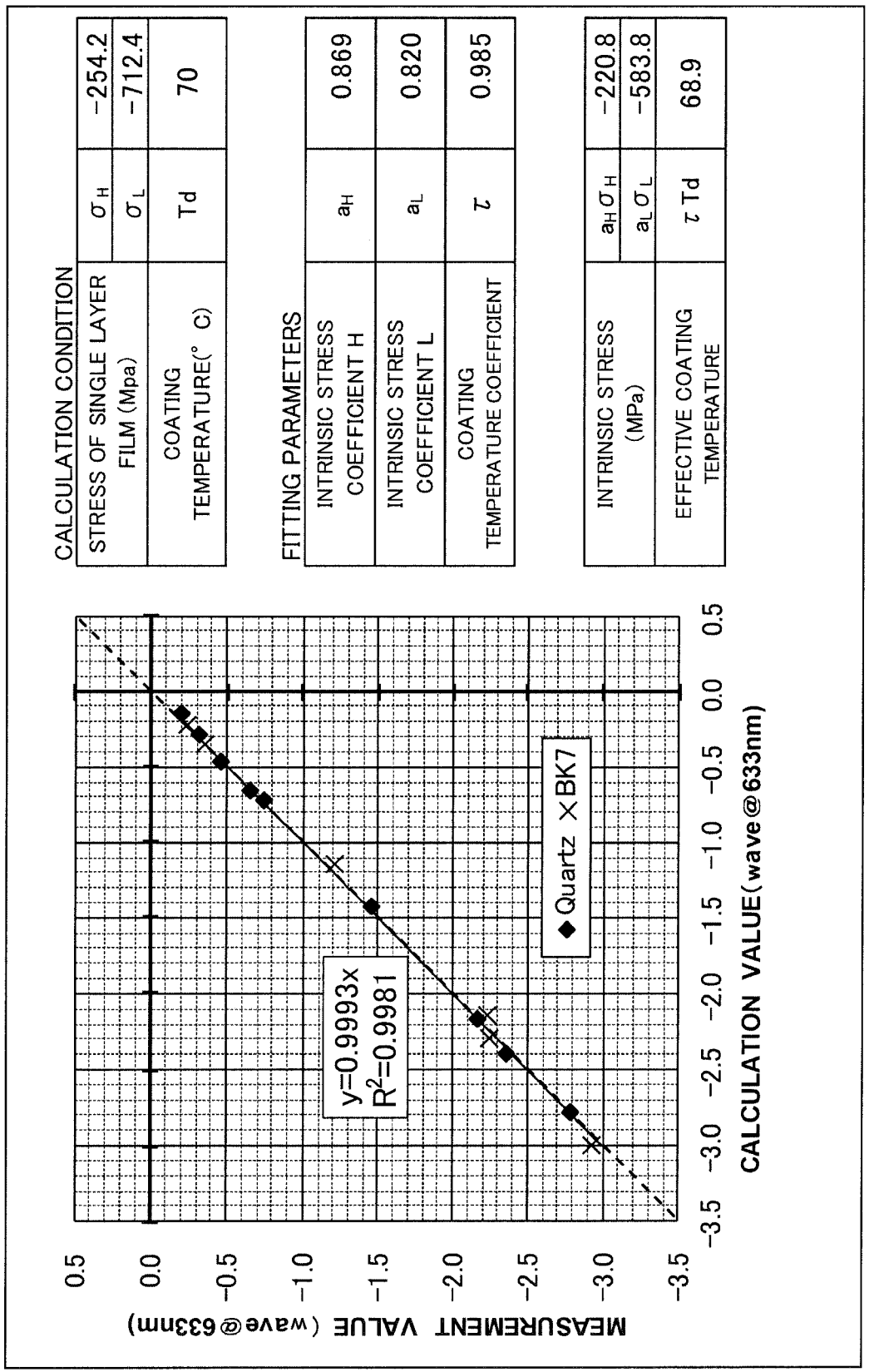
FIG. 16 is a graph similar to FIG. 14, in a case where intrinsic stress $\sigma_H$ of a high refractive index layer and intrinsic stress $\sigma_L$ of a low refractive index layer are set to different values.

In FIG. 16, using the same coating condition I and the same samples Nos. 1 to 15, Expressions (9) to (17) (excluding Expression (10)) are optimized with $\sigma_H$ set at −254.2 and $\sigma_L$ set at −712.4 unlike the above case (see a graph at the left in FIG. 16). Even in this case, as shown at the lower right in FIG. 16, the intrinsic stress $a_H\sigma_H$ on of the high refractive index layer becomes −220.8 [MPa], the intrinsic stress $a_L\sigma_L$ of the low refractive index layer becomes −583.8 [MPa], and the effective coating temperature $T_d$ becomes 68.9 [° C.]. Thus, all of these values are the same as in the case of FIG. 14.

Figure 17:
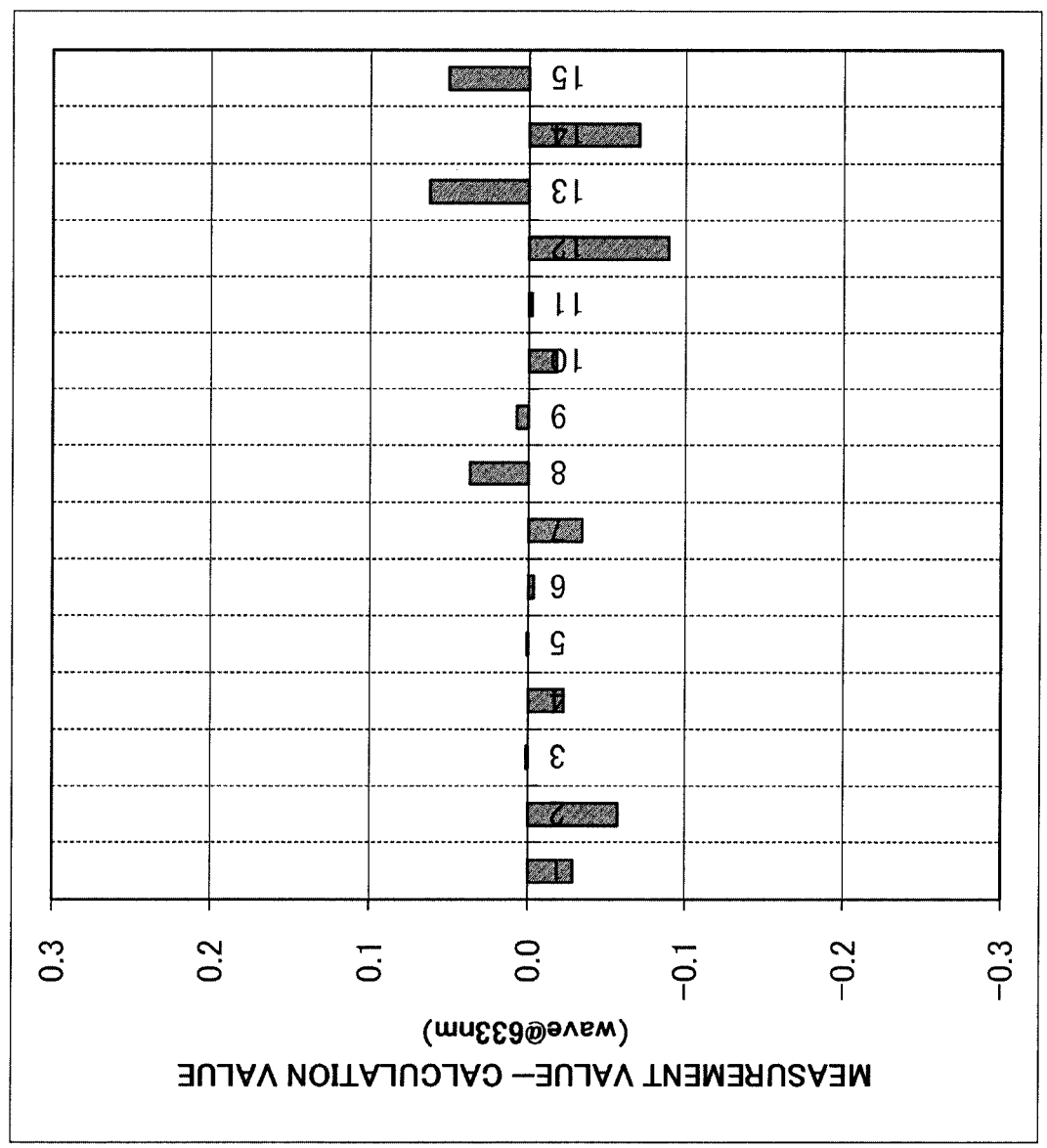
FIG. 17 is a graph similar to FIG. 15 and corresponding to the case of FIG. 16.

Further, in this case, (PV measurement value−PV calculation value) for each sample is kept within a range of ±0.1λ as shown in FIG. 17 similar to FIG. 15.

That is, since the first primary and first secondary fitting parameters $a_H$ and $a_L$ are provided, even if $\sigma_H$ and $\sigma_L$ are different values (optimization is performed with different ratios of $\sigma_H$ and $\sigma_L$), $\sigma_H$ and $\sigma_L$ become the same values, and through fitting, the film stresses of the high refractive index

TABLE 4

| | Substrate | | | | Film (Unit of film thickness: μm) | | | | Measured |
|---|---|---|---|---|---|---|---|---|---|
| No. | Glass material | Flatness | Diameter (mm) | Thickness (mm) | Number of layers | Total film thickness | H film thickness | L film thickness | flatness PV |
| 1 | Synthetic quartz | −0.210λ | 30 | 3 | 1 | 0.4 | 0.4 | 0.0 | −0.316λ |
| 2 | Synthetic quartz | 0.097λ | 30 | 3 | 1 | 0.4 | 0.0 | 0.4 | −0.205λ |
| 3 | Synthetic quartz | −0.130λ | 30 | 3 | 27 | 2.8 | 1.0 | 1.8 | −1.453λ |
| 4 | Synthetic quartz | 0.095λ | 30 | 5 | 28 | 4.5 | 1.8 | 2.7 | −0.651λ |
| 5 | Synthetic quartz | 0.021λ | 30 | 5 | 28 | 4.5 | 1.8 | 2.7 | −0.749λ |
| 6 | Synthetic quartz | −0.051λ | 50.8 | 12 | 29 | 4.7 | 1.7 | 3.1 | −0.456λ |
| 7 | Synthetic quartz | −0.191λ | 30 | 3 | 49 | 4.9 | 1.8 | 3.1 | −2.360λ |
| 8 | Synthetic quartz | 0.049λ | 30 | 3 | 49 | 4.9 | 1.8 | 3.1 | −2.171λ |
| 9 | Synthetic quartz | 0.098λ | 30 | 3 | 36 | 6.3 | 2.3 | 4.0 | −2.789λ |
| 10 | BK7 | −0.121λ | 30 | 3 | 1 | 0.4 | 0.4 | 0.0 | −0.240λ |
| 11 | BK7 | −0.112λ | 30 | 3 | 1 | 0.4 | 0.0 | 0.4 | −0.353λ |
| 12 | BK7 | 0.119λ | 30 | 3 | 27 | 2.8 | 1.0 | 1.8 | −1.208λ |
| 13 | BK7 | −0.130λ | 30 | 3 | 49 | 4.9 | 1.8 | 3.1 | −2.238λ |
| 14 | BK7 | 0.031λ | 30 | 3 | 49 | 4.9 | 1.8 | 3.1 | −2.231λ |
| 15 | BK7 | −0.176λ | 30 | 3 | 36 | 6.3 | 2.3 | 4.0 | −2.931λ |

Then, the fitting parameters are determined so that the PV calculation value is fitted to the PV measurement value in each sample. Thus, Expressions (9) to (17) (excluding Expression (10)) are optimized for the coating condition I, and thereafter, quantitative bending $\delta$ of the substrate on which a film is formed in the coating condition I is accurately predicted (steps S4 to S6).

As shown in FIG. 14, when Expressions (9) to (17) (excluding Expression (10)) are optimized with the various values (e.g., $\sigma_H=-313.8$, $\sigma_L=-625.1$) shown in "CALCULATION CONDITION" (see a graph at the left in FIG. 14), the fitting parameters become values shown in "FITTING PARAMETERS". After optimization, as shown at the lower layer and the low refractive index layer are uniquely determined. Further, the intrinsic stress and the thermal stress of the multilayer film and the effective substrate heating temperature at the time of coating are also uniquely determined.

Figure 18:
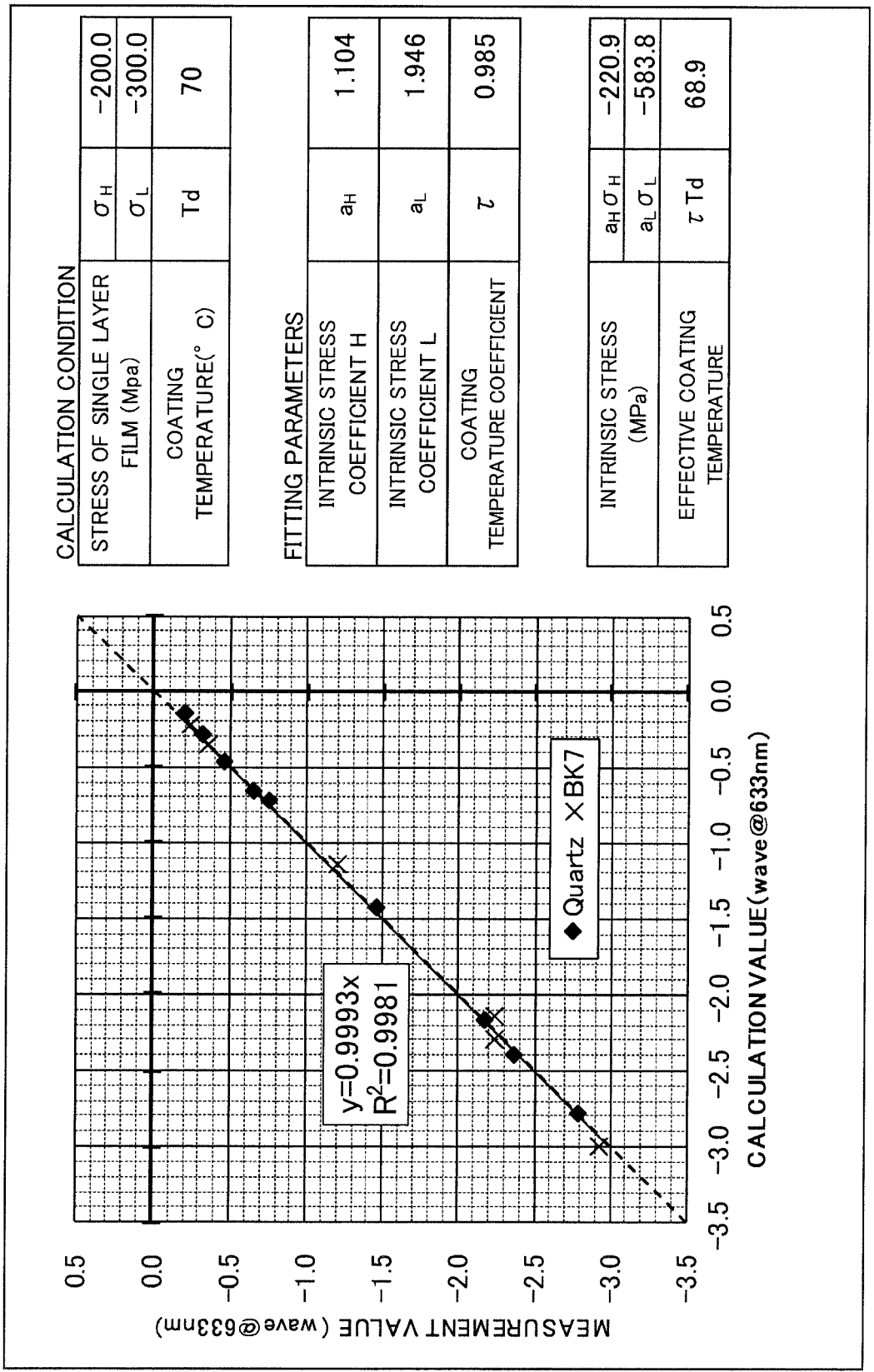
FIG. 18 is a graph similar to FIG. 14, in a case where intrinsic stress $\sigma_H$ of a high refractive index layer and intrinsic stress $\sigma_L$ of a low refractive index layer are set to other different values.

In FIG. 18, using the same coating condition I and the same samples Nos. 1 to 15, Expressions (9) to (17) (excluding Expression (10)) are optimized with $\sigma_H$ set at −200.0 and $\sigma_L$ set at −300.0 unlike the above cases (see a graph at the left in FIG. 18). Even in this case, as shown at the lower right in FIG. 18, the intrinsic stress $a_H\sigma_H$ of the high refractive index layer becomes −220.9 [MPa], the intrinsic stress $a_H\sigma_H$ of the low refractive index layer becomes −583.8 [MPa], and the effective coating temperature $T_d$ becomes 68.9 [° C.]. Thus, all of these values are the same as in the cases of FIG. 14 and FIG. 16.

Figure 19:
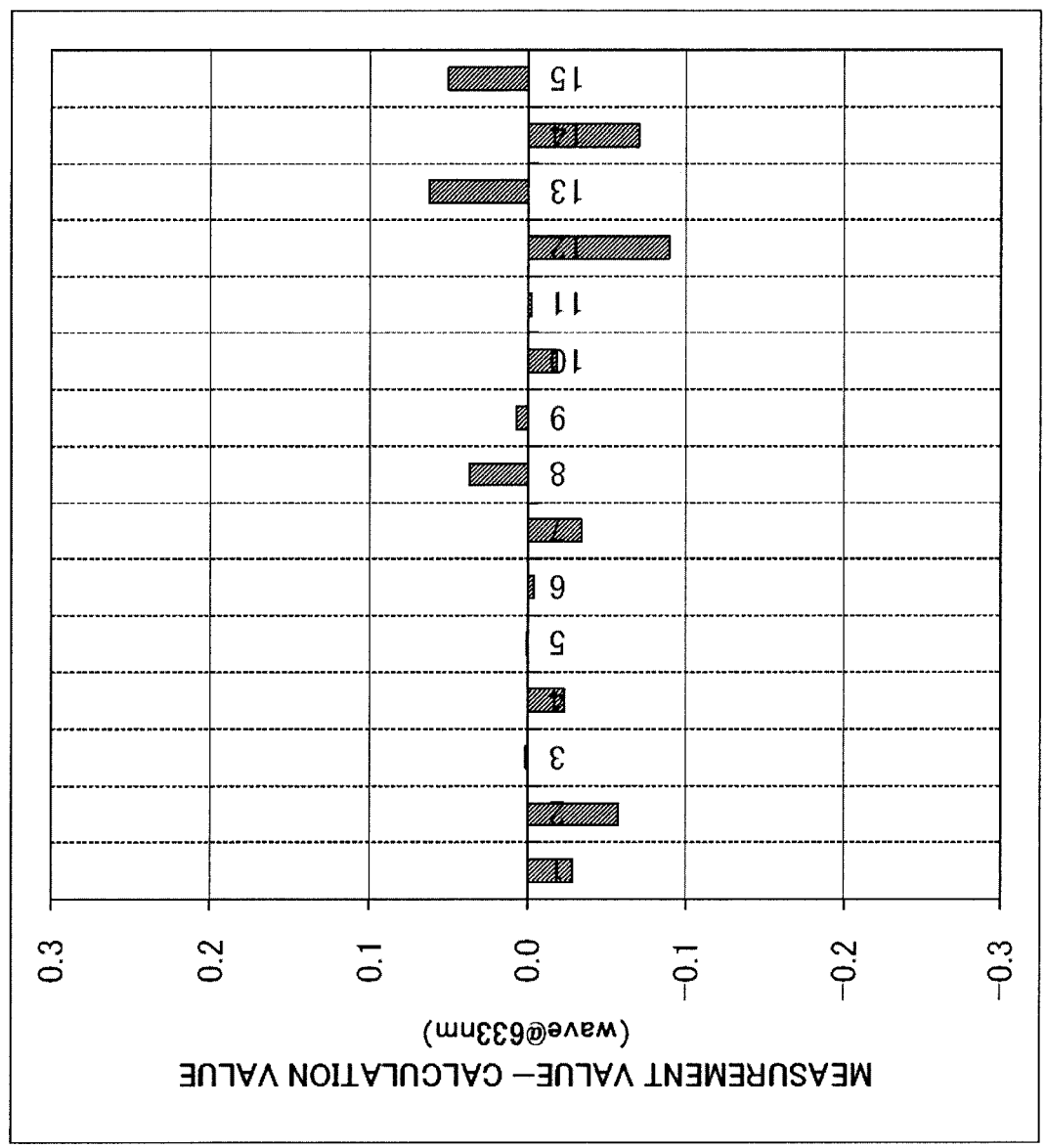
FIG. 19 is a graph similar to FIG. 15 and corresponding to the case of FIG. 18.

Further, also in this case, (PV measurement value−PV calculation value) for each sample is kept within a range of ±0.1λ as shown in FIG. 19 similar to FIG. 15 and FIG. 17.

Similarly, since the first primary and first secondary fitting parameters $a_H$ and $a_L$, are provided, even if $\sigma_H$ and $\sigma_L$ are different values, $\sigma_H$ and $\sigma_L$ become the same values, and through fitting, the film stresses of the high refractive index layer and the low refractive index layer are uniquely determined. Further, the intrinsic stress and the thermal stress of the multilayer film and the effective substrate heating temperature at the time of coating are also uniquely determined.

It is noted that, also in the coating condition I in the second embodiment, the stress is compressive stress and thus the bending δ occurs so as to protrude on the film formed surface side. However, also in a case where the stress is tensile stress and thus the bending δ occurs so as to be recessed on the film formed surface side, and in a case where the stress includes compressive stress and tensile stress in a mixed manner and thus the bending δ is determined on the basis of the balance therebetween, the bending δ is calculated in the same manner, depending on the signs of the stress and the bending δ.

That is, in the optical product bending prediction method according to the second embodiment of the present invention, bending δ of a substrate having a film is predicted by the computer performing calculation (steps S11 to S13) of Expressions (9) to (17) (excluding Expression (10)) in which $a_H$ is set as the first primary fitting parameter, $a_L$ is set as the first secondary fitting parameter, and $T_d$ is set as the second fitting parameter, and these parameters are optimized in the coating condition I using a plurality of samples (steps S1 to S6). Thus, it is possible to predict the bending δ of the substrate more accurately than that in the conventional art, and once Expressions (9) to (17) (excluding Expression (10)) are optimized by a plurality of samples, thereafter, accurate bending δ is obtained through calculation without manufacturing samples in each time, whereby an optical product with no bending δ (having bending δ to a desired extent) can be easily manufactured at low cost. In addition, even if different values are input as $\sigma_H$ and $\sigma_L$, $\sigma_H$ and $\sigma_L$ become the same values through optimization. Then, the film stresses of the high refractive index layer and the low refractive index layer are uniquely determined, and the intrinsic stress and the thermal stress of the multilayer film and the effective substrate heating temperature at the time of coating are also uniquely determined. It is noted that Expression (16) corresponds to Expression (A3) in the claims, as described above.

Even in a case where the initial bending $\delta_0$ of the substrate is not taken into consideration in Expression (16) (corresponding to Expression (A1) in the claims), as the stress, the intrinsic stress and also the thermal stress are reflected in Expression (16) and the first primary, first secondary, and second fitting parameters, whereby it is possible to predict the bending δ of the substrate more accurately than that in the conventional art and the respective values are uniquely determined. Similarly, even in a case where the third fitting parameter $\delta_s$ is further taken into consideration in Expression (16) (corresponding to Expression (A4) in the claims), owing to the introduction of the third fitting parameter $\delta_s$, it is possible to predict the bending δ of the substrate more accurately than that in the conventional art, and the respective values are uniquely determined. In addition, even in a case where the initial bending $\delta_0$ of the substrate is not taken into consideration but the third fitting parameter $\delta_s$ is taken into consideration in Expression (16) (corresponding to Expression (A2) in the claims), it is possible to predict the bending δ of the substrate more accurately than that in the conventional art.

Further, the optical product bending prediction program according to the second embodiment of the present invention forms, through execution thereof by the computer, the control means 8 which is capable of referring to storage in the storage means 6 about Expressions (9) to (17) (excluding Expression (10)) in which $a_H$ is set as the first primary fitting parameter, $a_L$ is set as the first secondary fitting parameter, $T_d$ is set as the second fitting parameter, and $\delta_s$ is set as the third fitting parameter, and these parameters are optimized in the coating condition I using a plurality of samples (steps S1 to S6), and predicts the bending δ of the substrate having the film through calculation of Expressions (9) to (17) (excluding Expression (10)). Thus, the bending prediction program enables the computer to form the control means 8 capable of predicting the bending δ of the substrate more accurately than that in the conventional art, and once Expressions (9) to (17) (excluding Expression (10)) are optimized by a plurality of samples, thereafter, accurate bending δ is obtained through calculation without manufacturing samples in each time, whereby an optical product with no bending δ (having bending δ to a desired extent) can be easily manufactured at low cost, and the respective values are uniquely determined.

Even in a case where the initial bending $\delta_0$ of the substrate is not taken into consideration in Expression (16) (corresponding to Expression (A1) in the claims), as the stress, intrinsic stress and also thermal stress are reflected in Expression (16) and the first primary, first secondary, and second fitting parameters, whereby the control means 8 capable of predicting the bending δ of the substrate more accurately than that in the conventional art and uniquely determining the respective values is formed by the computer. Similarly, even in a case where the third fitting parameter $\delta_s$ is further taken into consideration in Expression (16) (corresponding to Expression (A4) in the claims), owing to the introduction of the third fitting parameter $\delta_s$, the control means 8 capable of predicting the bending δ of the substrate more accurately than that in the conventional art and uniquely determining the respective values is formed by the computer. In addition, even in a case where the initial bending $\delta_0$ of the substrate is not taken into consideration but the third fitting parameter $\delta_s$ is taken into consideration in Expression (16) (corresponding to Expression (A2) in the claims), the control means 8 capable of predicting the bending δ of the substrate more accurately than that in the conventional art and uniquely determining the respective values is formed by the computer.

In the second embodiment, the same modifications as in the first embodiment are applicable as appropriate.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

The invention claimed is:

1. A computer implemented optical product bending prediction program configured to predict a bending δ of a substrate having a film by execution thereof by a computer,
wherein the computer includes a non-transitory, computer-readable storage medium storing the optical product bending prediction program and an integrated film designing program, and control means capable of referring to the non-transitory computer-readable storage medium to execute the optical product bending prediction program and the integrated film designing program stored therein,
wherein the optical product bending prediction program stored in the non-transitory, computer-readable medium includes the following Expressions (A1) to (I), in which a is set as a first fitting parameter and $T_d$ is set as a second fitting parameter, the fitting parameters having been optimized for each coating condition using a plurality of samples,
wherein the control means is configured to execute the optical product bending prediction program to perform calculations to predict the bending δ of the substrate having the film using the Expressions (A1) to (I), $$\delta = \frac{3l^2}{b^2}\left(\frac{1-v_s}{E_s}\right)d\sigma \tag{A1}$$

$$\sigma = a\sigma_{int} + (\alpha_s - \alpha_f)\left(\frac{E_f}{1-v_f}\right)(T - T_d) \tag{B1}$$

$$d = d_H + d_L \tag{C}$$

$$\sigma_{int} = \tilde{d}_H \sigma_H + \tilde{d}_L \sigma_L \tag{D}$$

$$\tilde{d}_H = d_H / d \tag{E}$$

$$\tilde{d}_L = d_L / d \tag{F}$$

$$E_f = \tilde{d}_H E_H + \tilde{d}_L E_L \tag{G}$$

$$v_f = \tilde{d}_H v_H + \tilde{d}_L v_L \tag{H}$$

$$\alpha_f = \tilde{d}_H \alpha_H + \tilde{d}_L \alpha_L. \tag{I}$$

wherein $\sigma_{int}$ is intrinsic stress, $E_f$ is a Young's modulus of a multilayer film, $E_H$ is a Young's modulus of a high refractive index layer, $E_L$ is a Young's modulus of a low refractive index layer, $v_f$ is a Poisson's ratio of the multilayer film, $v_H$ is a Poisson's ratio of the high refractive index layer, $v_L$ a Poisson's ratio of the low refractive index layer, $\alpha_f$ is a coefficient of linear expansion of the multilayer film, $\alpha_H$ is a coefficient of linear expansion of the high refractive index layer, $\alpha_L$ is a coefficient of linear expansion of the low refractive index layer, $\alpha_s$ is a coefficient of linear expansion of the substrate, T is a room temperature, d is a film thickness, b is a thickness of the substrate, l is a radius of the substrate, $E_s$ is a Young's modulus of the substrate, $v_s$ is a Poisson's ratio of the substrate, $d_H$ is a total film thickness of the high refractive index layer, $d_L$ is a total film thickness of the low refractive index layer, $\sigma_H$ is intrinsic stress of the high refractive index layer, and $\sigma_L$ is intrinsic stress of the low refractive index layer, and
wherein the film designing program stored in the non-transitory, computer-readable medium, automatically passes values determined by the film designing program to the bending prediction program, whereby an accurate bending δ of the substrate can be determined during or at the completion of executing the film designing program.

2. A computer implemented optical product bending prediction program configured to predict a bending δ of a substrate having a film by execution thereof by a computer,
wherein the computer includes a non-transitory, computer-readable storage medium storing the optical product bending prediction program and an integrated film designing program, and control means capable of referring to the non-transitory, computer-readable storage medium to execute the optical product bending prediction program and the integrated film designing program stored therein,
wherein the optical product bending prediction program stored in the non-transitory, computer-readable medium includes the following Expressions (A1) to (I), in which $a_H$ is set as a first primary fitting parameter, $a_L$ is set as a first secondary fitting parameter, and $T_d$ is set as a second fitting parameter, the fitting parameters having been optimized for each coating condition using a plurality of samples,
wherein the control means is configured to execute the optical product bending prediction program to perform calculations to predict the bending δ of the substrate having a film using the Expressions (A1) to (I), $$\delta = \frac{3l^2}{b^2}\left(\frac{1-v_s}{E_s}\right)d\sigma \tag{A1}$$

$$\sigma = a_H \sigma_H \tilde{d}_H + a_L \sigma_L \tilde{d}_L + (\alpha_s - \alpha_f)\left(\frac{E_f}{1-v_f}\right)(T - T_d) \tag{B2}$$

$$d = d_H + d_L \tag{C}$$

$$\tilde{d}_H = d_H / d \tag{E}$$

$$\tilde{d}_L = d_L / d \tag{F}$$

$$E_f = \tilde{d}_H E_H + \tilde{d}_L E_L \tag{G}$$

$$v_f = \tilde{d}_H v_H + \tilde{d}_L v_L \tag{H}$$

$$\alpha_f = \tilde{d}_H \alpha_H + \tilde{d}_L \alpha_L. \tag{I}$$

wherein $\sigma_{int}$ is intrinsic stress, $E_f$ is a Young's modulus of a multilayer film, $E_H$ is a Young's modulus of a high refractive index layer, $E_L$ is a Young's modulus of a low refractive index layer, $v_f$ is a Poisson's ratio of the multilayer film, $v_H$ is a Poisson's ratio of the high refractive index layer, $v_L$ is a Poisson's ratio of the low refractive index layer, $\alpha_f$ is a coefficient of linear expansion of the multilayer film, $\alpha_H$ is a coefficient of linear expansion of the high refractive index layer, $\alpha_L$ is a coefficient of linear expansion of the low refractive index layer, $\alpha_s$ is a coefficient of linear expansion of the substrate, T is a room temperature, d is a film thickness, b is a thickness of the substrate, l is a radius of the substrate, $E_s$ is a Young's modulus of the substrate, $v_s$ is a Poisson's ratio of the substrate, $d_H$ is a total film thickness of the high refractive index layer, $d_L$ is a total film thickness of the low refractive index layer, $\sigma_H$ is intrinsic stress of the high refractive index layer, and $\sigma_L$ is intrinsic stress of the low refractive index layer, and
wherein the film designing program stored in the non-transitory, computer-readable medium, automatically passes values determined by the film designing program to the bending prediction program, whereby an accurate bending δ of the substrate is determined during or at the completion of the execution of the film designing program.

3. The computer implemented optical product bending prediction program according to claim 1, wherein the Expression (A1) is replaced with the following Expression (A2), in which $\delta_s$ is set as a third fitting parameter, and
wherein the control means is configured to execute the optical product bending prediction program to perform calculations to predict the bending δ of the substrate having the film using the Expressions (A2) to (I) for which optimization has been performed in each of the coating conditions using the plurality of samples $$\delta = \frac{3l^2}{b^2}\left(\frac{1-v_s}{E_s}\right)d\sigma + \delta_s. \quad (A2)$$

4. The computer implemented optical product bending prediction program according to claim 2, wherein the Expression (A1) is replaced with the following Expression (A2), in which $\delta_s$ is set as a third fitting parameter, and
wherein the control means is configured to execute the optical product bending prediction program to perform calculations to predict the bending δ of the substrate having the film using the Expressions (A2) to (I) for which optimization has been performed in each of the coating conditions using the plurality of samples $$\delta = \frac{3l^2}{b^2}\left(\frac{1-v_s}{E_s}\right)d\sigma + \delta_s. \quad (A2)$$

5. The computer implemented optical product bending prediction program according to claim 1, wherein the Expression (A1) is replaced with the following Expression (A3), including bending $\delta_0$ of the substrate on which the film has not yet been formed, and
wherein the control means is configured to execute the optical product bending prediction program to perform calculations to predict the bending δ of the substrate having the film using the Expressions (A3) to (I) for which optimization has been performed in each of the coating conditions using the plurality of samples $$\delta = \frac{3l^2}{b^2}\left(\frac{1-v_s}{E_s}\right)d\sigma + \delta_0. \quad (A3)$$

6. The computer implemented optical product bending prediction program according to claim 2, wherein the Expression (A1) is replaced with the following Expression (A3), including bending $\delta_0$ of the substrate on which the film has not yet been formed, and
wherein the control means is configured to execute the optical product bending prediction program to perform calculations to predict the bending δ of the substrate having the film using the Expressions (A3) to (I) for which optimization has been performed in each of the coating conditions using the plurality of samples $$\delta = \frac{3l^2}{b^2}\left(\frac{1-v_s}{E_s}\right)d\sigma + \delta_0. \quad (A3)$$

7. The computer implemented optical product bending prediction program according to claim 1, wherein the Expression (A1) is replaced with the following Expression (A4), including a third fitting parameter $\delta_s$ and bending $\delta_0$ of the substrate on which the film has not yet been formed, and
wherein the control means is configured to execute the optical product bending prediction program to perform calculations to predict the bending δ of the substrate having the film using the Expressions (A4) to (I) for which optimization has been performed in each of the coating conditions using the plurality of samples $$\delta = \frac{3l^2}{b^2}\left(\frac{1-v_s}{E_s}\right)d\sigma + \delta_0 + \delta_s. \quad (A4)$$

8. The computer implemented optical product bending prediction program according to claim 2, wherein the Expression (A1) is replaced with the following Expression (A4) including a third fitting parameter $\delta_s$ and bending $\delta_0$ of the substrate on which the film has not yet been formed, and
wherein the control means is configured to execute the optical product bending prediction program to perform calculations to predict the bending δ of the substrate having the film using the Expressions (A4) to (I) for which optimization has been performed in each of the coating conditions using the plurality of samples $$\delta = \frac{3l^2}{b^2}\left(\frac{1-v_s}{E_s}\right)d\sigma + \delta_0 + \delta_s. \quad (A4)$$

\* \* \* \* \*